(12) United States Patent
Beachnau et al.

(10) Patent No.: US 12,074,557 B2
(45) Date of Patent: Aug. 27, 2024

(54) HYBRID PHOTOVOLTAIC-THERMAL AND CO-GENERATION SYSTEM

(71) Applicant: ICARUS RT, INC., Carlsbad, CA (US)

(72) Inventors: Brian Beachnau, Mesa, AZ (US); Jarred Druzynski, San Diego, CA (US); Alexander Cauchon, San Diego, CA (US); Mark G. Anderson, Carlsbad, CA (US)

(73) Assignee: ICARUS RT, INC., Carlsbad, CA (US)

( * ) Notice: Subject to any disclaimer, the term of this patent is extended or adjusted under 35 U.S.C. 154(b) by 0 days.

(21) Appl. No.: 18/334,149

(22) Filed: Jun. 13, 2023

(65) Prior Publication Data

US 2023/0402956 A1     Dec. 14, 2023

Related U.S. Application Data

(60) Provisional application No. 63/351,529, filed on Jun. 13, 2022.

(51) Int. Cl.
*H02S 10/10*     (2014.01)
*F24S 10/55*     (2018.01)
(Continued)

(52) U.S. Cl.
CPC .............. *H02S 10/10* (2014.12); *F24S 10/55* (2018.05); *F24S 60/30* (2018.05); *H02S 40/44* (2014.12)

(58) Field of Classification Search
CPC .......... H02S 10/10; H02S 10/30; H02S 40/44; H02S 40/42; F24S 60/30; F24S 10/55
(Continued)

(56) References Cited

U.S. PATENT DOCUMENTS 4,002,031 A    1/1977   Bell
4,481,975 A * 11/1984   Buckley ............... F24S 10/504
                                                 137/561 A
(Continued)

FOREIGN PATENT DOCUMENTS

AU       2017304787 A1 * 5/2019  ............... F28D 9/00
CA         2833878 A1 * 11/2012  ............. F28D 9/005
(Continued)

OTHER PUBLICATIONS

Cauchon et al., Exploring Graphene to enhance the performance of hybrid solar photovoltaic thermal collectors, TechConnect Briefs 2022, TechConnect.org, ISBN 979-8-218-00238-1.
(Continued)

*Primary Examiner* — Ko-Wei Lin
(74) *Attorney, Agent, or Firm* — Perkins Coie LLP

(57) ABSTRACT

A hybrid photovoltaic-thermal system provides co-generation of electrical energy and thermal energy. Electrical energy is efficiently generated by photovoltaic panels that are cooled by heat exchangers attached thereto, and the cooling of the photovoltaic panels improves the energy output efficiency of the photovoltaic panels. The heat exchangers flow fluid through its channels, and the fluid collects heat from the photovoltaic panels to which the heat exchangers are attached. The heated fluid is then received at and stored in a thermal battery. The thermal battery can be a fluid tank that encourages the fluid to retain the heat collected from the photovoltaic panels. The thermal battery can then supply the heated fluid to thermal loads as thermal energy.

20 Claims, 25 Drawing Sheets

(51) Int. Cl.
*F24S 60/30* (2018.01)
*H02S 40/44* (2014.01)

(58) Field of Classification Search
USPC ........ 126/704, 589, 599, 636, 640, 641, 642
IPC .......... H02S 10/30,10/10, 10/70, 10/50, 10/55, 40/42, 40/44; F24S 60/30, 40/55
See application file for complete search history.

(56) References Cited

U.S. PATENT DOCUMENTS

| | | | | |
|---|---|---|---|---|
| 4,513,732 | A * | 4/1985 | Feldman, Jr. ......... | F02G 1/0445 126/645 |
| 4,545,365 | A | 10/1985 | Wetzel | |
| 6,837,236 | B1 * | 1/2005 | Lichtenberger ......... | H02S 40/44 126/634 |
| 7,340,899 | B1 * | 3/2008 | Rubak ................. | F28B 1/02 60/641.2 |
| 10,969,119 | B1 * | 4/2021 | Bayoumi .............. | F24S 60/30 |
| 2003/0131842 | A1 * | 7/2003 | Doll ................. | F24S 10/503 126/651 |
| 2007/0227573 | A1 | 10/2007 | Hunter et al. | |
| 2008/0115817 | A1 * | 5/2008 | Defries ............... | H02S 99/00 136/256 |
| 2008/0116694 | A1 | 5/2008 | Hendershot | |
| 2008/0314438 | A1 * | 12/2008 | Tran ................. | H01L 31/0547 136/248 |
| 2009/0126364 | A1 | 5/2009 | Mills et al. | |
| 2009/0199892 | A1 | 8/2009 | Farquhar | |
| 2009/0229264 | A1 | 9/2009 | Gilon et al. | |
| 2010/0153312 | A1 * | 6/2010 | Lemaire ............. | G06Q 99/00 126/677 |
| 2010/0288334 | A1 * | 11/2010 | Chu ................. | F24S 80/56 136/248 |
| 2011/0011802 | A1 | 1/2011 | Maydan | |
| 2012/0192920 | A1 * | 8/2012 | McCowan ............ | H02S 40/44 126/634 |
| 2013/0255752 | A1 | 10/2013 | Escher et al. | |
| 2013/0285380 | A1 | 10/2013 | Afremov | |
| 2014/0125060 | A1 | 5/2014 | Sahm | |
| 2015/0168018 | A1 | 6/2015 | Swift et al. | |
| 2015/0280040 | A1 | 10/2015 | Siddiqui et al. | |
| 2016/0131532 | A1 * | 5/2016 | Zernickel ............ | H01L 21/6875 29/592 |
| 2017/0230000 | A1 * | 8/2017 | Abdelghany Hassabou ................. | F28D 20/00 |
| 2020/0007079 | A1 | 1/2020 | Anderson et al. | |
| 2021/0167724 | A1 | 6/2021 | Anderson et al. | |

FOREIGN PATENT DOCUMENTS

| | | | | |
|---|---|---|---|---|
| CN | 101798996 | A | | 8/2010 |
| CN | 101798996 | A * | 8/2010 | ............. Y02E 10/46 |
| CN | 107120996 | A * | 9/2017 | ............. F28G 7/00 |
| CN | 110411037 | A * | 11/2019 | ............. B01F 7/162 |
| CN | 115087708 | A * | 9/2022 | ............. B32B 15/02 |
| DE | 202006017581 | U1 | | 1/2007 |
| DE | 202010001198 | U1 * | 8/2010 | ........ H01L 31/0521 |
| DE | 102018129988 | A1 * | 1/2020 | ......... B60H 1/00278 |
| EP | 1933105 | A1 * | 6/2008 | .......... F28D 9/0043 |
| GB | 1561981 | A * | 3/1980 | ............. F28F 3/046 |
| JP | H05322470 | A * | 5/1992 | ............... F28F 1/32 |
| JP | 08014669 | A * | 1/1996 | ............. F24S 10/755 |
| JP | 11108467 | A * | 4/1999 | ............... F24J 2/34 |
| JP | 2000227256 | A * | 8/2000 | ............. H02S 40/44 |
| JP | 4050821 | B2 * | 2/2008 | ................ F28F 3/04 |
| JP | 2010258154 | A * | 11/2010 | ................ F24J 2/26 |
| JP | 2016152711 | A * | 8/2016 | ............. F24S 21/00 |
| JP | 2016178796 | A * | 10/2016 | ............... C08K 3/04 |
| JP | 2018162785 | A * | 10/2018 | ................ F02C 3/30 |
| KR | 101206858 | B1 * | 9/2011 | ............. F28D 9/005 |
| KR | 20190036603 | A * | 9/2017 | ............. H05K 7/209 |
| WO | 2012176136 | A2 | | 12/2012 |
| WO | 2015006719 | A1 | | 1/2015 |
| WO | 2016091969 | A1 | | 6/2016 |
| WO | WO-2018145253 | A1 * | 8/2018 | ................ F28F 1/32 |
| WO | 2020036755 | A1 | | 2/2020 |

OTHER PUBLICATIONS

Chen, Junjie et al., "Effect of oxidation degree on the thermal properties of graphene oxide." 2020. Journal of Materials Research and Technology, vol. 9, Issue 6, pp. 13740-13748, ISSN 2238-7854, doi:10.1016/j .jmrt.2020.09.092.

Das, Sidhartha et al., "Role of graphene nanofluids on heat transfer enhancement in thermosyphon." 2019. Journal of Science: Advanced Materials and Devices, vol. 4, Issue 1, pp. 163-169, ISSN 2468-2179, doi: 10.1016/j.isamd.2019.01.005.

Goyal, V. et al., "Thermal properties of the hybrid graphene-metal nano-micro-composites: Applications in thermal interface materials." 2012, Applied Physics Letters, 100(7) 073113, doi: 10.1063/1.3687173.

International Search Report and Written Opinion mailed Apr. 26, 2018 in App. PCT/US18/18030.

International Search Report and Written Opinion mailed Oct. 29, 2019 in App. PCT/US2019/044932.

Konstantinos Kontomaris, HFO-1336mzz-Z: High Temperature Chemical Stability and Use as A Working Fluid in Organic Rankine Cycles, Purdue University (Year: 2014), International Refrigeration and Air Conditioning Conference, 11 pages.

O'Neill, Catherine et al., "Thermal conductivity of 3-dimensional graphene papers." 2021 Carbon Trends, vol. 4, 100041, ISSN 2667-0569, doi: 10.1016/j.cartre.2021.100041.

Prasher, R. S. et al., "Thermal Resistance of Particle Laden Polymeric Thermal Interface Materials." 2003. Journal of Heat Transfer, 125(6), 170.doi:10.1115/1.1621893.

Seo, Tae et al., "Tailored CVD graphene coating as a transparent and flexible gas barrier." 2016, Scientific Reports. 6. 24143. doi:10.1038/srep24143.

Shahil, K. M. F. et al., "Thermal properties of graphene and multilayer graphene: Applications in thermal interface materials." 2012, Solid State Communications, 152(15), 1331-1340. doi: 10.1016/j .ssc.2012.04.034.

Sudhindra, S. et al., "Noncured Graphene Thermal Interface Materials for High-Power Electronics: Minimizing the Thermal Contact Resistance." 2021. Nanomaterials, 11, 1699, doi:10.3390/nano 11071699.

Tang, B. et al., "Graphene-Assisted Thermal Interface Materials with a Satisfied Interface Contact Level Between the Matrix and Fillers." 2018. Nanoscale Res Lett 13,276. doi: 10.I 186/sI 1671-018-2704-1.

Torii, Shuichi, "Enhancement of heat transfer performance in pipe flow using graphene-oxide-nanofluid and its application." 2021. Materials Today: Proceedings, vol. 35, Part 3, pp. 506-511 , ISSN 2214-7853, doi: 10. I 016/i.matpr.2020.04.078.

J. Caldino-Herrera et al., "Small Organic Rankine Cycle Coupled to Parabolic Trough Solar Concentrator" Energy Procedia 129 (2017), 700-707 (Year: 2017).

Zhang, W. et al., "Measurement on the Thermal Properties of Graphene Powder." 2017 International Journal of Thermophysics, 38(8). doi:10.1007/s10765-017-2261-3.

International Search Report and Written Opinion mailed Mar. 12, 2024 in App. PCT/US2023/025188.

* cited by examiner

HYBRID PHOTOVOLTAIC-THERMAL AND CO-GENERATION SYSTEM

CROSS-REFERENCE TO RELATED APPLICATION(S)

This application claims priority to, and the benefit of, U.S. Provisional Application No. 63/351,529, filed on Jun. 13, 2022, which is incorporated herein by reference in its entirety.

TECHNICAL FIELD

The present disclosure relates to heat extraction systems and techniques for photovoltaic thermal systems.

BACKGROUND

A photovoltaic solar panel is a device generally comprising semiconductor materials configured to convert at least a portion of incident light into electrical energy. Photovoltaic cells included in solar panels, along with the other materials forming the solar panel, absorb a portion of the incident solar energy onto the panel, which can result in heating up the solar panel substantially above an optimum operating temperature. This heating of solar panels can lead to reduced efficiency of solar panels (e.g., performance in converting the received energy into electricity) that in turn decreases the electrical energy output from the solar panels.

SUMMARY

The present disclosure provides energy co-generation systems, and components and processes related thereto. Example energy co-generation systems described herein are hybrid photovoltaic-thermal systems that are capable to outputting, supplying, and storing both electrical energy generated from photovoltaic (PV) panels and thermal energy held by thermal fluid. Operational and output efficiency arrives from using the thermal fluid to extract heat from the PV panels, which improves the energy efficiency of the PV panels, and then storing the heated thermal fluid in a thermal battery, which can then be used at a later time for thermal energy needs and loads. As an example, the thermal battery can be used as a source of hot water, thereby reducing consumption or usage of other energy means to heat a water supply.

Aspects of the disclosure provide unique performance and manufacturing advantages associated with heat exchangers used to extract the heat from PV panels in the example energy co-generation or hybrid photovoltaic-thermal systems. A first example aspect involves a parallel, multiwall structure that may be referred to herein as a multiwall heat exchanger, and the multiwall heat exchanger includes parallel fluid channels through which the thermal fluid flows to collect or extract heat from a nearby or adjacent PV panel. A second example aspect involves a twin-sheet construction with a chevron-style flow pattern that may be referred to herein as a chevron heat exchanger. Yet another example aspect involves a roll-bonded heat exchanger having a first sheet and a second sheet that are coupled to one another via a roll-bonding process, and fluid channels are defined between the first sheet and the second sheet during the roll-bonding process. As referred to herein, heat extraction modules or heat exchangers are devices, modules, structures, or the like that facilitate the flow or circulation of fluid near or adjacent to a heat source, which can result in cooling of the heat source and heating of the flowed or circulated fluid.

These, and other aspects are disclosed throughout the present document.

BRIEF DESCRIPTION OF THE DRAWINGS

The accompanying drawings, which are incorporated in and form a part of this specification illustrate embodiments of the invention and together with the description, serve to explain the principles of the invention.

DETAILED DESCRIPTION

Figure 1:
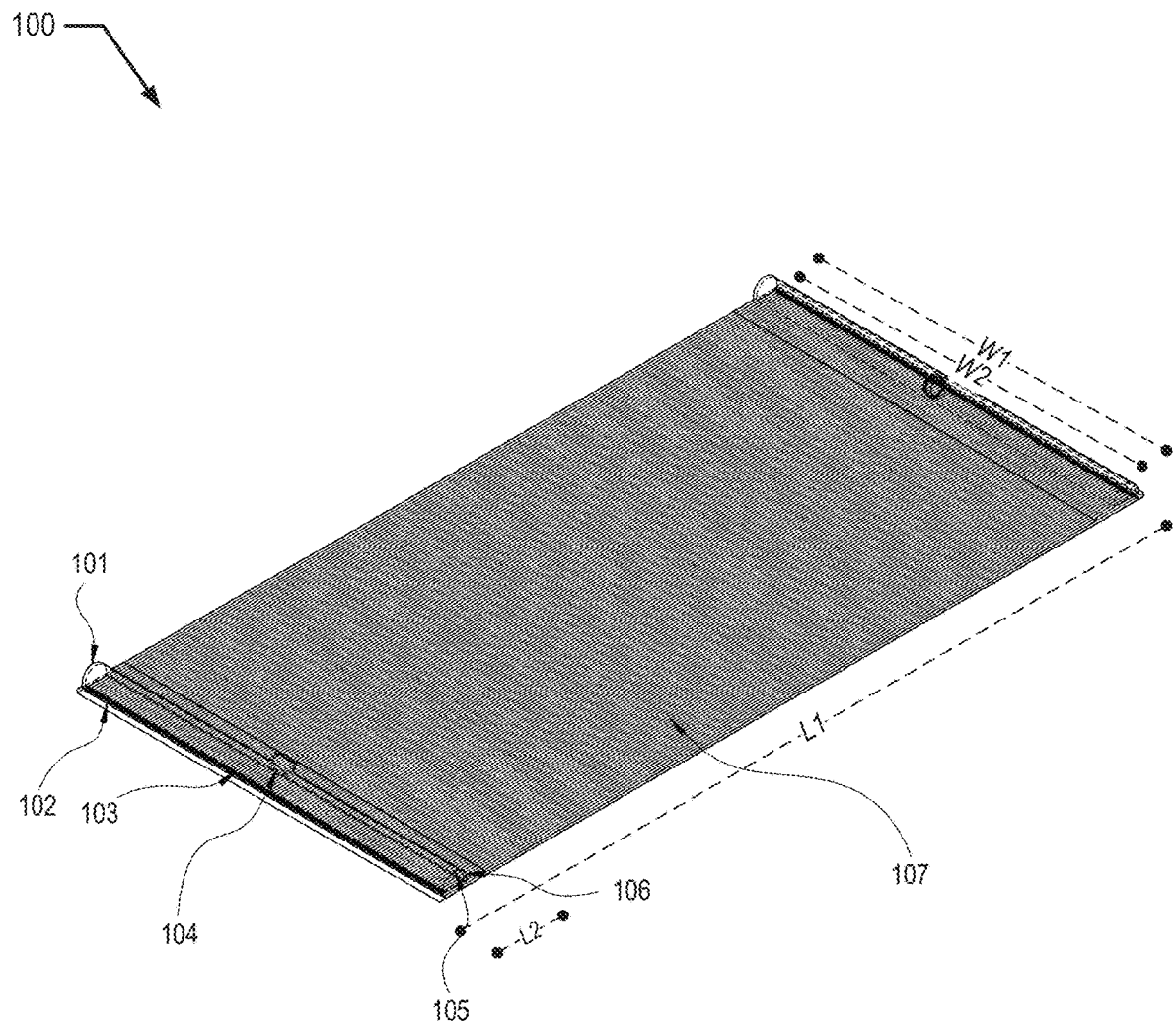
FIG. 1 is a perspective view of an example of a single-piece multiwall heat extraction module.
Figure 2:
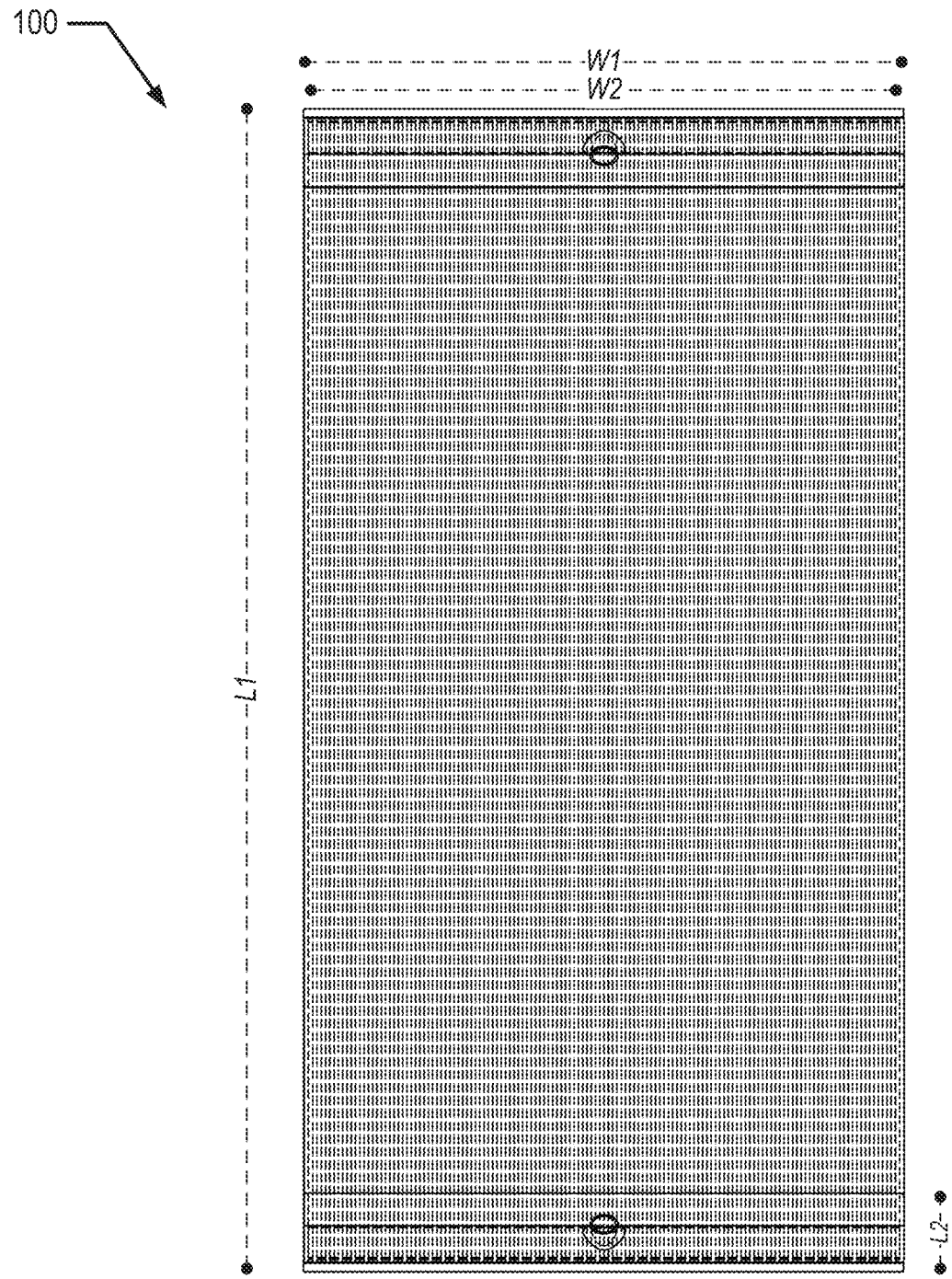
FIG. 2 is a front view of an example of a single-piece multiwall heat extraction module.
Figure 3:
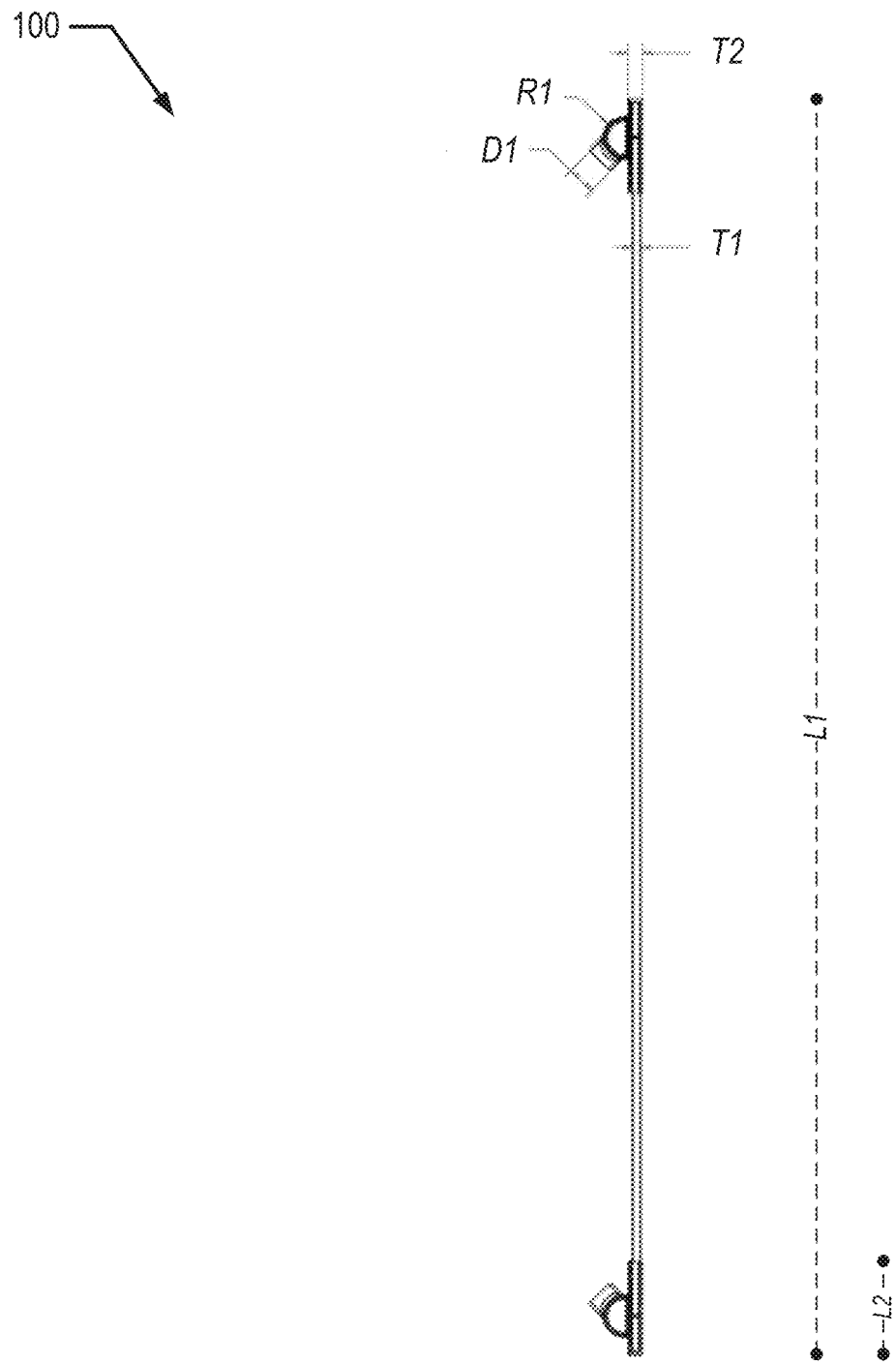
FIG. 3 is a left view of an example of a single-piece multiwall heat extraction module.
Figure 4:
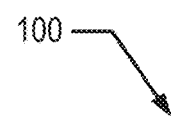
FIG. 4 is a front view of an example of a single-piece multiwall heat extraction module.
Figure 4:
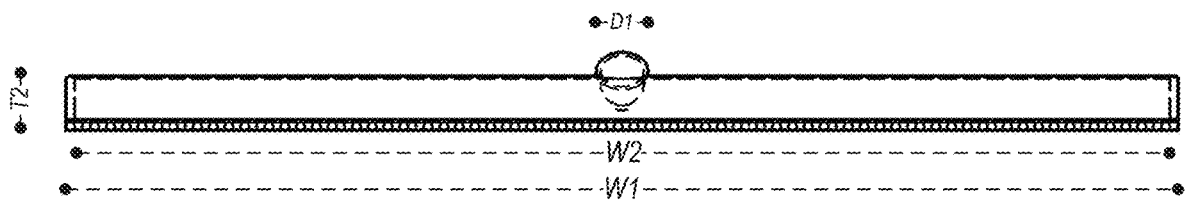
Figure 5:
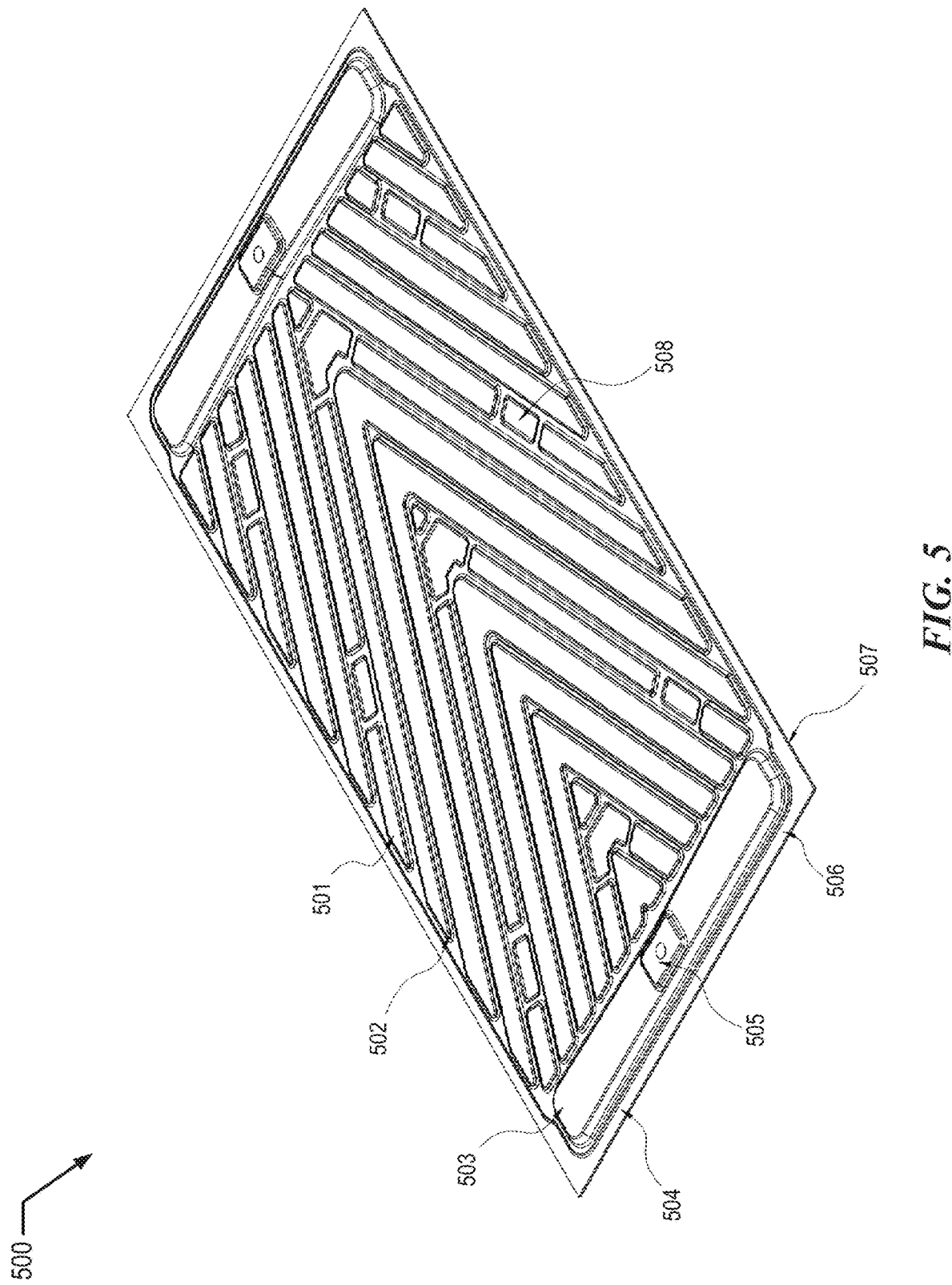
FIG. 5 is a perspective view of an example of a chevron heat extraction module.

The present disclosure provides a solar-plus-storage co-generation system that boosts PV output and generates hot water thus reducing utility costs and emissions for end-users. Current water heaters account for 25% of household energy use. Example co-generation systems described herein convert standard PV arrays into hybrid solar PV/Thermal (PV/T) systems with energy storage, increasing electrical power output by 12-18% and producing thermal energy while addressing these PV plus storage limitations. Additionally, the thermal energy gathered from the PV/T panel by the working fluid provides at least an additional 50% of installed generation. Storing energy reduces demand on the grid during peak hours, resulting in lower energy costs and reduced $CO_2$ emissions for end users. The example co-generation systems described herein can be integrated with systems that already have Li-Ion batteries installed, as the boosted panel power output can be collected by the Li-Ion battery while the thermal storage of the example co-generation systems charges with heat simultaneously. Moreover, the disclosed co-generation systems accelerate the return-on-investment (ROI) of PV plus storage systems, making them more accessible to customers at all levels.

To demonstrate the technical benefits of the example embodiments described herein, consider an example in which 19 GW of PV is installed in an area between 2022 and 2026. Assuming an average PV panel of 300-W, approximately 63 million panels would be installed. At a 0.05%/° C. loss factor per PV panel, an optimized system capable of cooling each PV panel by 20° C. according to the disclosed embodiments boosts the electric power output from a PV array. The resulting number of PV panels required to generate that same amount of energy, 32 billion kWh/year, could be reduced by 7 million panels (11%). Furthermore, cooling panels will extend panel lifetime by approximately 10% and improve lifetime performance by an additional 10% by minimizing degradation. Typical solar panels see a decline in power output of roughly 1% per year of operation, and the example embodiments described herein are designed to combat that by reducing thermal cycling stresses. Including heat collection and thermal storage, the disclosed embodiments can substantially displace natural gas required for water heating. When installed, example co-generation or hybrid photovoltaic-thermal systems can boost the electric power output of the PV array by 12-18%, and can further generate, collect and store thermal energy for consumer use. A typical PV cell lifetime is 25 to 30 years, but by removing heat from the panels, the example co-generation or hybrid photovoltaic-thermal systems effectively increase the lifetime of panels and lower the rate at which panel waste is produced.

Greenhouse gas (GHG) emissions are the primary cause of global climate change as well as a primary cause of local and regional air pollution, which disproportionately impact disadvantaged communities. Example embodiments described herein will allow energy consumers to maximize solar assets, while reducing the impact of behind-the-meter generation on the grid. At utility scale, the example co-generation or hybrid photovoltaic-thermal systems help control intermittent generation and avoid curtailment. With the disclosed embodiments, users can address the need for low-cost, sustainable stored solar energy, while improving air quality and reducing waste in communities of concern.

Example embodiments will also reduce stress on the central power grid, especially at peak demand times. Reduction of grid load also minimizes fire risk. The example embodiments, via storage of co-generated electrical and thermal energy, enable the distribution of power demand more evenly throughout the day, flattening the energy usage/consumption curve and reducing risk of wildfires caused by overutilized power lines.

In particular, the disclosed embodiments provide these technical improvements over existing energy systems, which involve additional costs that do not justify their performance increases. The disclosed embodiments involve the usage of unique and optimized materials, heat extractor designs, fabrication techniques, and smart control systems. For example, heat extractors described herein can attach to PV panel structures without being invasive to the security of the structure or the PV panel itself. This and other advances described herein enable an efficient and low-cost system that substantially outperforms existing energy systems. As another example, the co-generation of thermal energy, storage of this thermal energy in thermal batteries, and the supply of thermal energy to thermal loads improves upon some existing energy systems, such as those described in U.S. patent application Ser. No. 16/483,026 and U.S. patent application Ser. No. 17/174,212, the contents of each of these identified applications being incorporated by reference in their entirety herein. These existing systems leverage thermodynamic cycles (e.g., the organic Rankine cycle) to generate additional electricity from waste water used to cool solar systems, but the additional electrical output may not justify the additional resources and components needed. These existing systems do not co-generate thermal energy for use by external thermal loads.

The disclosed embodiments additionally provide improved heat exchangers for coupling to PV panels to increase PV panel efficiency and enable co-generation of thermal energy with PV panel outputs. Example heat exchangers disclosed herein include improved channel geometries and features that offer significant increases in wetted surface area, leading to increases in the PV panel area that is cooled and in heat transfer and energy absorption. Expanded surface area and the flow-through approach of the example heat exchangers disclosed herein creates a more uniform cooling pattern across a PV panel, leading to extended PV panel life.

I. EXEMPLARY HEAT EXTRACTION MODULES

According to a first aspect of the present disclosure, a heat exchanger with multiple parallel walls defining fluid channels will be described with respect to FIGS. 1-4. Another aspect of the present disclosure will be described with respect to FIGS. 5-8, and involves a heat exchanger with a twin-sheet construction a chevron-style flow pattern. These heat exchangers may be heat exchangers of a hybrid photovoltaic-thermal system such as those shown and described herein.

The internal channel geometry and dimensions of both types of heat exchangers improve flow distribution and internal convective heat transfer, while minimizing system pressure losses and pump demand. Additionally, the geometry provides structural rigidity and flat surfaces that are crucial to the installation and performance of the device.

Material wall thicknesses of both designs optimize conductive heat transfer, wetted surface area, and device weight, while maintaining strength and structural integrity.

The heat exchanger body is manufactured from a thermoplastic, such as Polycarbonate (PC), that is easily printed, machined, extruded, injection molded, or thermoformed. This material provides a high strength-to-mass ratio, low production cost, and adequate thermal conductivity to facilitate heat transfer between the panel and working fluid. To further improve heat transfer, additives such as carbon nanotubes, graphite fibers or ceramics may be combined with the chosen thermoplastic.

The heat exchanger may be manufactured as one single piece or constructed as an assembly of individual components (panel with parallel channels or chevron design, inlet and outlet headers, gaskets, etc.). Furthermore, the multiwalled panel may be produced as one piece or a configuration of a top, bottom, and wall assembly.

In some examples, the working fluid passing through the heat exchanger is further passed along within a co-generation or hybrid photovoltaic-thermal system to satisfy or less thermal loads (e.g., domestic loads, generator systems that use thermodynamic cycles). In some examples, the working fluid of the heat exchanger may be utilized by thermal loads of a co-generation or hybrid photovoltaic-thermal system. For example, water passing through the heat exchanger is provided for pool heating, domestic water heating, or the like.

In some embodiments, the working fluid of the heat exchanger is an organic refrigerant. Aside from water, the working fluid may include water and additional additives, including nanoparticles to form a nanofluid. Nanofluid within the system may improve thermal conductivity and heat transfer between the exchanger and the heat sink.

Candidates for nanofluid additives include zinc oxide, graphite, graphite oxide, graphene, graphene oxide, and aluminum oxide.

A layer of thermal interface material between the photovoltaic panel and the heat exchanger facilitates heat transfer, minimizing the insulating air gap. Candidates for thermal interface materials in a silicone oil matrix include zinc oxide, graphite, graphite oxide, graphene oxide, and aluminum oxide.

With reference to FIGS. 1-4, an embodiment of the single-piece multiwall heat extraction module or multiwall heat exchanger 100 will be described in more detail. The single-piece multiwall heat extraction module includes the following critical features: header shape 101, channel shape and dimension 102, reservoir port, size, and dimensions 103, inlet diameter, angle, fillets, and depth 104, header wall thickness 105, reservoir volume 106, and parallel channel configuration and spacing 107. A completed assembly made from separate components would be identical in appearance.

In some embodiments, the multiwall heat exchanger 100 is a panel-like rectangular structure and has dimensions corresponding to those of a PV panel, thus facilitating attachment of the multiwall heat exchanger 100 to the PV panel. In one example, the multiwall heat exchanger 100 has a panel length L1 and a panel width W1, and in some embodiments, the panel length L1 and the panel width W1 correspond to a panel length and a panel width of a PV panel to which the multiwall heat exchanger 100 attaches. In some examples, the panel length L1 of the multiwall heat exchanger 100 is approximately 1760.60 millimeters (mm), between 1600 mm and 1800 mm, between 1500 mm and 2000 mm, or between 1000 mm and 3000 mm. In some examples, the panel length L1 of the multiwall heat exchanger 100 is above 98% of a panel length of a corresponding PV panel, above 95% of a panel length of the corresponding PV panel, above 90% of a panel length of the corresponding PV panel, above 85% of a panel length of the corresponding PV panel, or above 80% of a panel length of the corresponding PV panel. In some examples, the panel width W1 of the multiwall heat exchanger 100 is approximately 838.20 mm, between 800 mm and 860 mm, between 750 mm and 900 mm, or between 750 mm and 1000 mm. In some examples, the panel width W1 of the multiwall heat exchanger 100 is above 98% of a panel width of a corresponding PV panel, above 95% of a panel width of the corresponding PV panel, above 90% of a panel width of the corresponding PV panel, above 85% of a panel width of the corresponding PV panel, or above 80% of a panel width of the corresponding PV panel. In some embodiments, the area spanned by the multiwall heat exchanger 100 (according to the panel length L1 and the panel width W1) is above 90%, above 85%, above 60%, or above 50% of a surface area of a corresponding PV panel.

In some embodiments, the multiwall heat exchanger 100 has a panel thickness T1. In some embodiments, panel thickness T1 is optimized for flow distribution and heat transfer from a PV panel into a fluid flowing within the multiwall heat exchanger 100. In some examples, the panel thickness T1 is 10.70 mm, between 8 mm and 12 mm, between 5 mm and 20 mm, or between 5 mm and 25 mm.

The parallel channel configuration of the multiwall heat exchanger optimizes flow distribution, fluid outlet temperature, and solar panel cooling. Furthermore, the selected channel design is compatible with several manufacturing options, such as extrusion, that would otherwise be impossible for alternate patterns.

For the multiwall heat exchanger 100, the inlet and outlet headers further improve flow uniformity throughout the heat exchanger. Header shape, volume, inlet diameter, inlet depth, and orientation, as well as geometry, width, length, and location of the intermediate port between the header reservoir and channel inlets, are each crucial to performance. Additionally, the header geometry contains critical design aspects such as internal fillets that minimize flow separation and pressure drop throughout the device. Finally, the header wall thickness satisfies all anticipated manufacturing constraints and installation and operational stress loads with adequate factors of safety, while minimizing device weight.

In some embodiments, the headers include a volume radius R1 and an inlet diameter D1. In some examples, the volume radius R1 is 29.40 mm, between 28 mm and 30 mm, between 25 mm and 35 mm, or between 20 mm and 40 mm. In some examples, the inlet diameter D1 is 41.30 mm, between 38 mm and 42 mm, between 35 mm and 45 mm, or between 30 mm and 50 mm. In some examples, the inlet diameter D1 and the volume radius R1 are optimized with respect to one another to optimize flow of fluid into and out of the multiwall heat exchanger 100. For example, the inlet diameter D1 is between 100% and 200% of the volume radius R1 (or between half of and equal to the volume diameter), between 110% and 180% of the volume radius R1, between 130% and 160% of the volume radius R1, between 135% and 150% of the volume radius R1, or approximately 140% of the volume radius R1.

In some embodiments, the multiwall heat exchanger 100 includes a reservoir with a reservoir width W2, and the reservoir width W2 is less than the panel width W1. In some examples, the reservoir width W2 is approximately 816.80 mm, above 98% of panel width W1, above 97.5% of panel width W1, above 97% of panel width W1, above 95% of panel width W1, or above 90% of panel width W1. In some embodiments, the multiwall heat exchanger 100 includes a reservoir with a reservoir length L2 along a dimension of the panel length L1. In one example, the reservoir length L2 is approximately 131 mm, between 2% and 25% of panel length L1, between 5% and 15% of panel length L1, or between 7% and 10% of panel length L1. In some embodiments, the multiwall heat exchanger 100 includes a reservoir height or thickness T2 that is greater than the panel thickness T1. In some examples, the reservoir height/thickness T2 is 20 mm, between 120% and 400% of panel thickness T1, between 150% and 250% of panel thickness T1, or between 180% and 200% of panel thickness T1. In some embodiments, the multiwall heat exchanger 100 includes two reservoirs, with one being at an inlet end and one being at an outlet end. The two reservoirs can be similar or the same dimensions.

With reference to FIGS. 5-8, an embodiment of a chevron heat extraction module or chevron heat exchanger 500 will be described in more detail. The chevron heat extraction module includes the following critical design aspects: chevron channel angle, shape, and dimension 501, pattern edge fillet dimension 502, reservoir port, size, and dimensions 503, perimeter bonding dimension 504, inlet diameter, angle, fillets, and depth 505, material sheet thickness 506, two-piece construction 507, and adhesive pad geometry, dimensions, location, and quantity 508. According to example embodiments, the chevron heat exchanger 500 improves flow mixing and turbulence due to the chevron-based channel geometry, thereby increasing heat transfer or extraction from a PV panel.

In some embodiments, the chevron heat exchanger 500 is a panel-like rectangular structure and has dimensions corresponding to those of a PV panel, thus facilitating attachment of the chevron heat exchanger 500 to the PV panel. In one example, the chevron heat exchanger 500 has a panel length L1 and a panel width W1, and in some embodiments, the panel length L1 and the panel width W1 correspond to a panel length and a panel width of a PV panel to which the chevron heat exchanger 500 attaches. In some examples, the panel length L1 of the chevron heat exchanger 500 is approximately 1752.60 mm, between 1600 mm and 1800 mm, between 1500 mm and 2000 mm, or between 1000 mm and 3000 mm. In some examples, the panel length L1 of the chevron heat exchanger 500 is above 98% of a panel length of a corresponding PV panel, above 95% of a panel length of the corresponding PV panel, above 90% of a panel length of the corresponding PV panel, above 85% of a panel length of the corresponding PV panel, or above 80% of a panel length of the corresponding PV panel. In some examples, the panel width W1 of the chevron heat exchanger 500 is approximately 914.40 mm, between 800 mm and 860 mm, between 750 mm and 900 mm, or between 750 mm and 1000 mm. In some examples, the panel width W1 of the chevron heat exchanger 500 is above 98% of a panel width of a corresponding PV panel, above 95% of a panel width of the corresponding PV panel, above 90% of a panel width of the corresponding PV panel, above 85% of a panel width of the corresponding PV panel, or above 80% of a panel width of the corresponding PV panel. In some embodiments, the area spanned by the chevron heat exchanger 500 (according to the panel length L1 and the panel width W1) is above 90%, above 85%, above 60%, or above 50% of a surface area of a corresponding PV panel.

In some embodiments, the chevron heat exchanger 500 can be wider than a corresponding multiwall heat exchanger (e.g., a multiwall heat exchanger configured to fit the same class, type, category of PV panels as the chevron heat exchanger). For example, the panel width W1 of a chevron heat exchanger can be less than the panel width W1 of the multiwall heat exchanger. This may be due to the multiwall heat exchanger header/reservoir size causing interference with PV panel frame. Since the chevron configuration is shorter, the chevron heat exchanger can fit beneath the edges of the frame and cover a wider area.

In some embodiments, the chevron heat exchanger 500 has a twin-sheet construction in which a first sheet is bonded with a second sheet to form a composite construction. In some portions, the chevron heat exchanger 500 has a single-sheet thickness T1, which may be approximately 3.18 mm, between 3 mm and 5 mm, between 2 mm and 8 mm, or between 1.5 mm and 10 mm. In other portions, the chevron heat exchanger 500 has a twin-sheet or composite thickness T2, which may be approximately 9.35 mm, between 8 mm and 10 mm, between 4 mm and 16 mm, or between 3 mm and 20 mm. In some examples, the composite thickness T2 is at least 200% of the single-sheet thickness T1, or at least 210%, at least 225%, or at least 250% of the single-sheet thickness T1 (with the additional thickness being attributed to channel gaps between two sheets). In some examples, the composite thickness T2 is representative of a channel thickness or channel depth. In some embodiments, at least the composite thickness T2 is optimized for flow distribution and heat transfer from a PV panel into a fluid flowing within the chevron heat exchanger 500.

The flow pattern of the chevron heat exchanger optimizes flow distribution, fluid outlet temperature, and solar panel cooling. This selected pattern is designed specifically to overcome constraints associated with manufacturing options like thermoforming and incorporates optimized bonding surface areas for twin-sheet construction.

Figure 6:
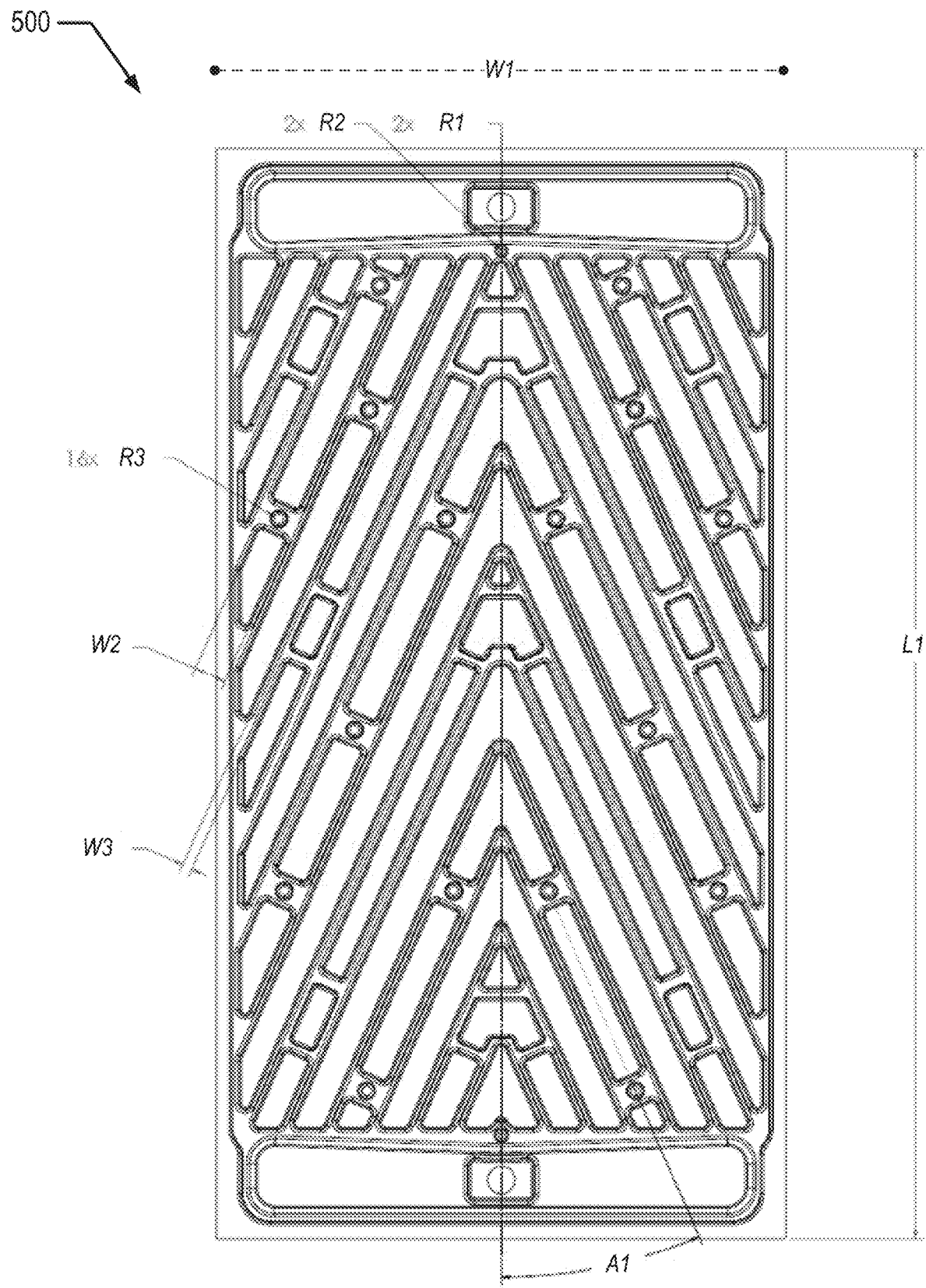
FIG. 6 is the front view of an example of a chevron heat extraction module.
Figure 7:
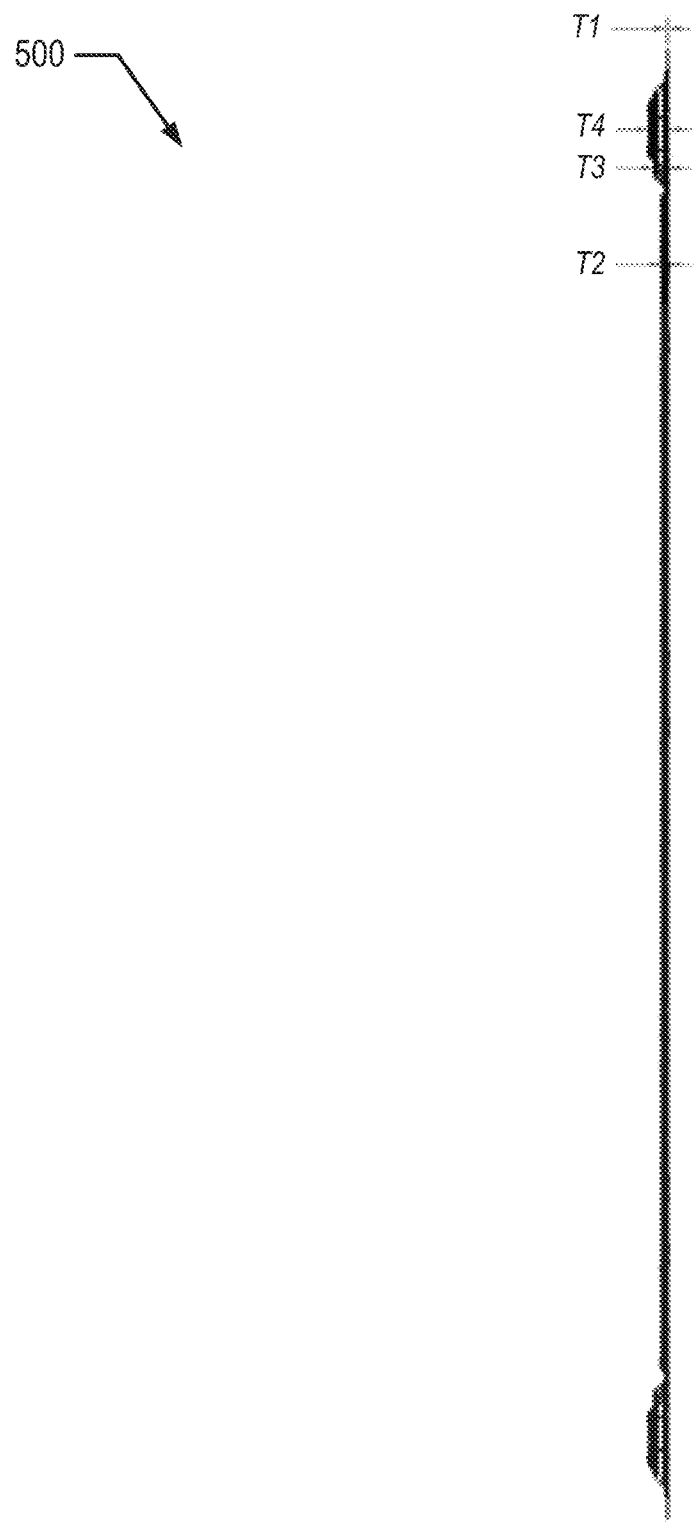
FIG. 7 is the left view of an example of a chevron heat extraction module.
Figure 8:
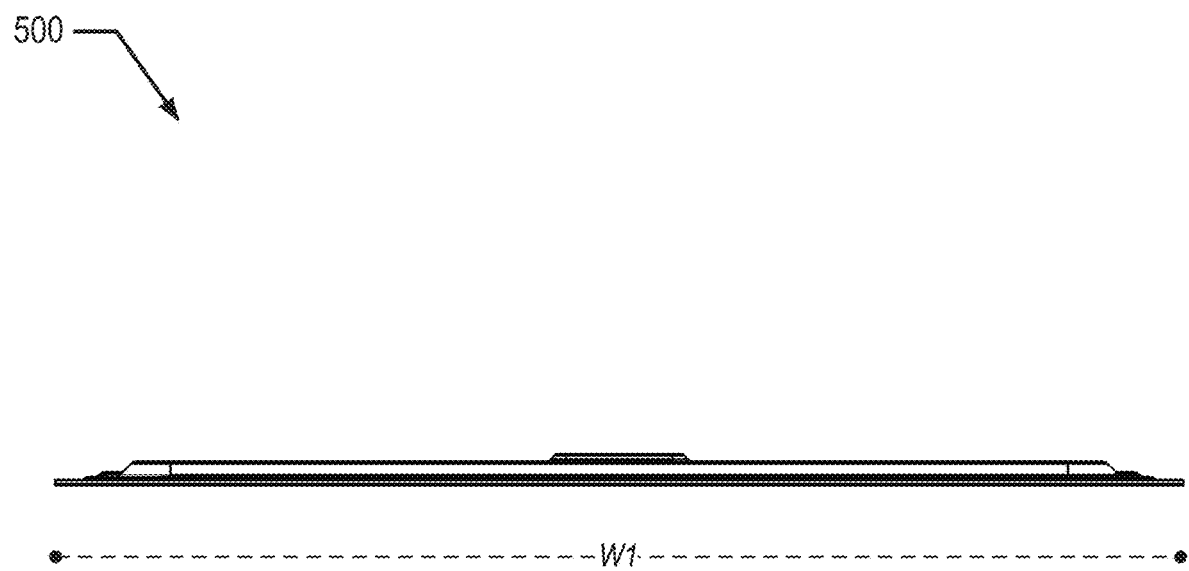
FIG. 8 is the front view of an example of a chevron heat extraction module.

As shown in FIG. 6, the chevron pattern of the fluid channels of the chevron heat exchanger 500 is defined by parameters that can be optimized for at least flow distribution and heat transfer. In some examples, a chevron angle A1 (with respect to a longitudinal axis of the chevron heat exchanger 500) is approximately 23.5°, between 220 and 25°, between 200 and 40°, between 150 and 50°, or between 100 and 75°. In some embodiments, the chevron angle A1 is optimized for flow characteristics and properties of a fluid that will flow through the chevron heat exchanger 500. In some examples, a channel width W2 is approximately 50.8 mm, between 45 mm and 55 mm, between 40 mm and 60 mm, or between 38 mm and 62 mm. In some examples, a channel gap W3 (a gap between consecutive or adjacent channels) is approximately 16 mm, between 15 mm and 18 mm, or between 12 mm and 20 mm.

In some embodiments, the chevron heat exchanger 500 includes one or more reservoirs; for example, the chevron heat exchanger 500 includes a reservoir at each of an inlet end and an outlet end. In some examples, the reservoirs elevate above the channel depth or composite thickness T2 of the chevron heat exchanger 500; for example, the reservoirs have a reservoir depth or reservoir thickness T3 of approximately 17.88 mm, between 15 mm and 20 mm, or between 13 mm and 26 mm. In some embodiments, the reservoir thickness T3 is optimized with respect to the composite thickness T2 or channel depth; for example, the reservoir thickness T3 is above 150% of the composite thickness T2, above 180% of the composite thickness T2, above 190% of the composite thickness T2, or above 200% of the composite thickness T2.

In some embodiments, an inlet or outlet port is disposed on top of a reservoir of the chevron heat exchanger 500. In some examples, a raised port thickness T4 is approximately 24.23 mm. In some embodiments, the raised port thickness T4 is greater than the reservoir thickness T3 by at least 1 mm, 2 mm, 3 mm, or 5 mm. In some embodiments, the raised port thickness T4 is at least 110%, 120%, 125%, or 140% of the reservoir thickness T3. In some embodiments, the inlet and outlet ports of the chevron heat exchanger 500 are characterized by a port radius R1 of approximately 22.23 mm, between 20 mm and 25 mm, between 18 mm and 27 mm, or between 15 mm and 30 mm.

For the chevron heat exchanger, one or more of the assembly sheets may be manufactured from metal alloys to further improve heat transfer and structural integrity.

In some embodiments, the assembly sheets that form the chevron heat exchanger can be adhered together via adhesive pads or adhesive material. FIG. 6 illustrates an example arrangement of circular adhesive pads having a pad radius R2 or a pad radius R3. In some examples, the pad radius R2 is 7.5 mm, between 6 mm and 10 mm, between 4 mm and 12 mm, or between 2 mm and 15 mm. In some examples, the pad radius R2 correlates with dimensions of the reservoirs of the heat exchanger; for example. In some examples, the pad radius R3 is 12.7 mm, between 10 mm and 15 mm, or between 5 mm and 20 mm. In some examples, the pad radius R3 is based on one or more of the channel width W2, the channel gap W3 or other channel-related dimensions. It will be appreciated that liquid adhesives, adhesive gels, mixture-based adhesives, and/or the like can be applied at the example locations indicated in FIG. 6, alternatively to adhesive pads.

As described herein, the size or dimensions of a heat exchanger can be based on a target PV panel to which the heat exchanger attaches, in some embodiments. Accordingly, a heat exchanger can be associated with a corresponding PV panel, PV panel type, PV panel class, PV panel structure, or the like. For example, a given heat exchanger can be associated with one of 200-Watt PV panels, 300-Watt PV panels, 400-Watt PV panels, 500-Watt PV panels, 600-Watt PV panels, or the like (provided that each type of PV panels have respectively unique dimensions).

II. EXEMPLARY ENERGY CO-GENERATION SYSTEMS

Figure 9A:
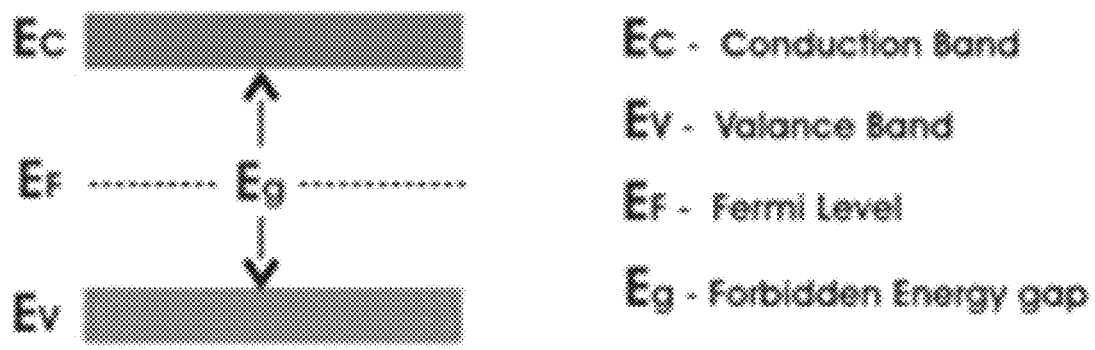
FIG. 9A is a diagram that demonstrates an operation of an example photovoltaic panel.

FIG. 9A illustrates a technical basis of photovoltaic operation, relating to band theory of solids. Atoms have electron orbitals at discrete energy levels, the two outermost orbitals being the valence and conduction bands. The difference in energy between these orbitals, known as the band gap energy ($E_g$), determines whether a particular material is an insulator, semiconductor, or conductor. Electrons present in the valence band will not produce current. For electrical insulators, it takes a lot of energy to transport an electron from the valence to conduction band; for electrical conductors it takes almost no energy for electrons to move from one band to another; for semiconductors it takes only a moderate amount of energy (i.e., what may be found in a typical photon from the sun) to move electrons into the conduction band.

Photovoltaic cells are typically an n-type and p-type semiconductor stacked together whose electrons may be excited from their valence to their conduction bands by solar radiation, where they may be utilized to do work. An n-type semiconductor is an impurity mixed semiconductor material used in electronics. The pentavalent impure atoms give free electrons to a semiconductor. A p-type semiconductor is an extrinsic type of semiconductor. When a trivalent impurity (like Boron, Aluminum, etc.) is added to an intrinsic or pure semiconductor (silicon or germanium), it is said to be a p-type semiconductor. The energy needed to excite these electrons is the band gap energy ($E_g$), which decreases with temperature. To be absorbed, an incident photon with energy $E_\gamma$ needs to have the same or more energy than the band gap of the material. If $E_\gamma < E_g$, nothing happens; if $E_\gamma = E_g$ an electron may be knocked from the valence to the conduction band perfectly; and finally, if $E_\gamma > E_g$ the electron will be knocked higher up in the conduction band, then relax down to its lowest energy state, releasing the excess energy as thermal energy. The band gap of a material decreases with temperature, allowing more photons in but converting more incident energy into waste heat, decreasing efficiency. This efficiency decrease comes in the form of a reduced open-circuit voltage that reflects the reduced band gap.

Figure 9B:
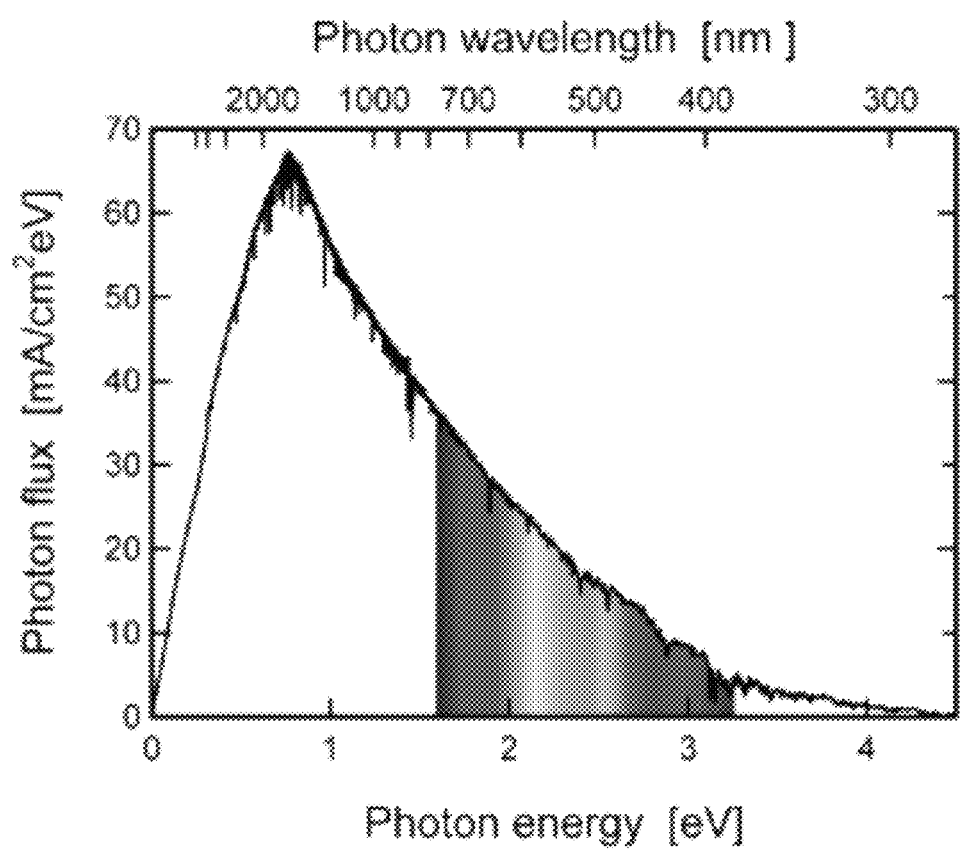
FIG. 9B illustrates an example of a distribution of photon flux versus photon energy incident in solar radiation.

FIG. 9B illustrates the solar spectrum, which is important in demonstrating energy waste during a photovoltaic process. Solar radiation comes in discrete quanta, or packets, of light, called photons, each with a distinct wavelength, frequency, and energy. The spectral photon flux vs. photon energy as shown in FIG. 9B shows relatively how many photons there are of a given energy.

Silicon has a band gap energy of ~1 eV, so for a typical silicon solar cell, the energy of all photons absorbed with energy less than ~1 eV is converted directly into heat; all photons with energy greater than ~1 eV donate energy to an electron such that it has sufficient energy to be used for electrical work, but any of their energy greater than ~1 eV is converted to heat; and only photons with energies the same as the band gap are used fully. While FIG. 9B peaks around 1 eV, it is still evident that much of the incoming radiation turns into thermal energy as opposed to electrical work.

Figure 9C:
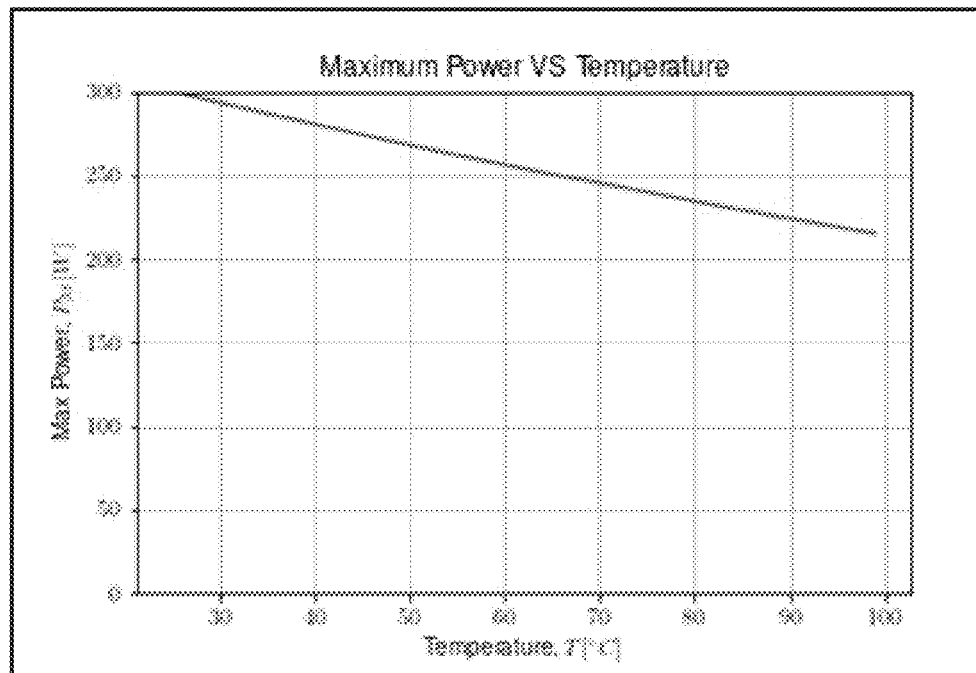
FIGS. 9C and 9D illustrates an example of the effects of temperature on efficiency and power of a photovoltaic panel or solar cell.
Figure 9D:
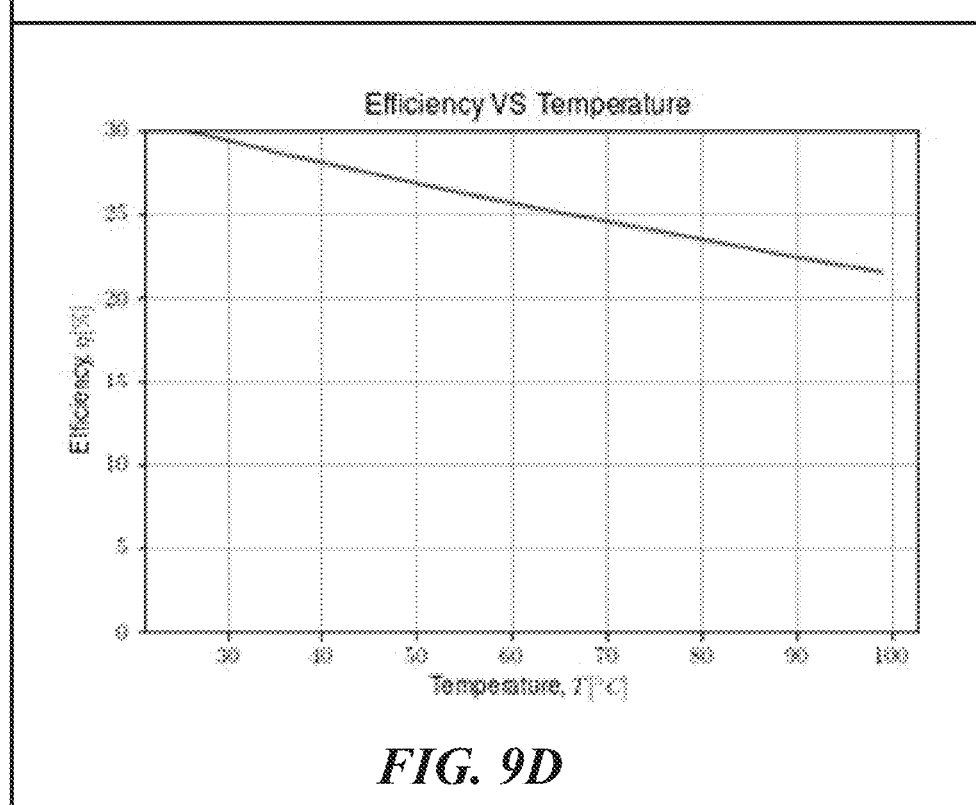

FIGS. 9C and 9D illustrates performance of an example PV panel as affected by temperature. The temperature coefficient is a metric used to show how much a panel's performance is affected by temperature. Standard silicon panels have a temperature coefficient of –0.5%/° C., meaning the maximum power of the panel decreases by around 0.5% per degree Celsius. FIG. 9C graphs this relationship for a standard 300W silicon PV panel, whose power rating is determined at 25° C. under 1 kW of incident radiation. Depending on the environment, uncooled solar panels can range in temperature from 50-80° C., leading to ~10-23% decrease in maximum power, shown in FIG. 9C.

Aside from the immediate loss in maximum power and efficiency seen by increasing panel temperature, the daily cycling of temperature anywhere from –40° C. to +85° C. can lead to thermal fatigue, decreasing the performance of the cell over time. The primary mode through which this thermal cycling negatively affects performance is through differential thermal expansion and contraction of the cell's component parts. As the different parts of a solar panel change temperature, they expand and contract at different rates, leading to stresses at their connection points. Silicon and the glass above it have similar thermal expansion coefficients, while the typically aluminum electrical contacts and typically polyethylene terephthalate (PET) or other plastic backing of the cell have thermal expansion coefficients around 10× higher. Panels are designed to minimize the effect these different rates of expansion have on the cell, but over time where the silicon meets the aluminum contacts and plastic backing small fractures begin to form in the silicon, affecting the transport of electrons.

Figure 9E:
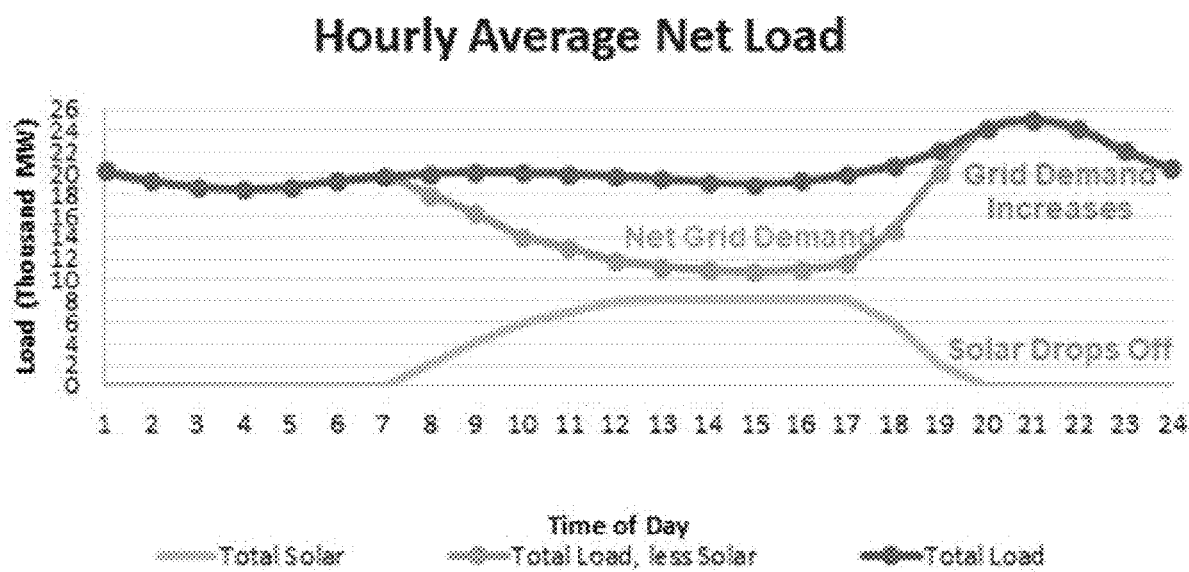
FIG. 9E illustrates an example of an energy consumption or usage curve.

Photovoltaic (PV) technology continues to face limitations in panel efficiency and energy storage after over 50 years of development. Today's PV panels convert less than 21% of incoming solar energy into electric power, with substantially greater losses as panels heat up during the day. Daytime solar generation is often mismatched with peak energy demand during evening hours, creating the California "duck" curve, shown in FIG. 9E. Utilities and consumers must often rely on fossil fuel generated power or expensive lithium battery storage to meet their peak energy demand. Lithium-ion energy batteries are the most common storage technology paired with PV systems. Unfortunately, the expense of purchasing and installing a 4-hour lithium-ion battery system limits wide scale implementation. In order to address the ever-increasing "duck" curve, California needs more energy storage and at a fraction of the cost of lithium-ion systems.

Example co-generation or hybrid photovoltaic-thermal systems overcome these technological challenges by extracting waste heat from PV panels, collecting and storing heat energy, and using the energy to heat the water supply on demand. The heat extractors described herein attach to the back of standard PV panels to lower panel temperature, improve PV panel efficiency, and heat the fluid flowing through the heat extractor.

According to example embodiments, a co-generation or hybrid photovoltaic-thermal system includes a thermal battery or a thermal tank that stores the co-generated thermal energy and enables the on-demand usage/consumption of the co-generated thermal energy (thus offsetting energy consumption imbalances, such as the "duck" curve). During peak production time, the fraction of incident energy that is wasted as heat is at its highest. The co-generation or hybrid photovoltaic-thermal system extracts this heat as hot water and stores it in the tank, which serves as a thermal battery. Utilization of this renewable heat generated as a byproduct of improving photovoltaic performance can reduce, diminish, or preclude consumption of natural gas which would otherwise be used as thermal energy.

In some embodiments, a co-generation or hybrid photovoltaic-thermal system includes a fluid storage tank configured to store at least 50 gallons, at least 100 gallons, at least 200 gallons, at least 300 gallons, or at least 500 gallons of a fluid, such as heated water. During experimental testing of an example 300-gallon thermal storage tank, thermal stratification stored a maximum of 18-kWh of energy. Thermal stratification is the separation of fluid into layers dependent on temperature. After 14 hours, without any energy added or removed, the energy stored in the tank was reduced to 15-kWh, demonstrating the potential for the system to store energy for on-demand over at least a 12-hour period. In some embodiments, thermal stratification is optimized to meet hot water demand during evening and nighttime as well as for emergency use during grid outages. In some embodiments, the thermal battery of a co-generation or hybrid photovoltaic-thermal system stores thermal energy for up to 72 hours without significant losses.

Figure 10:
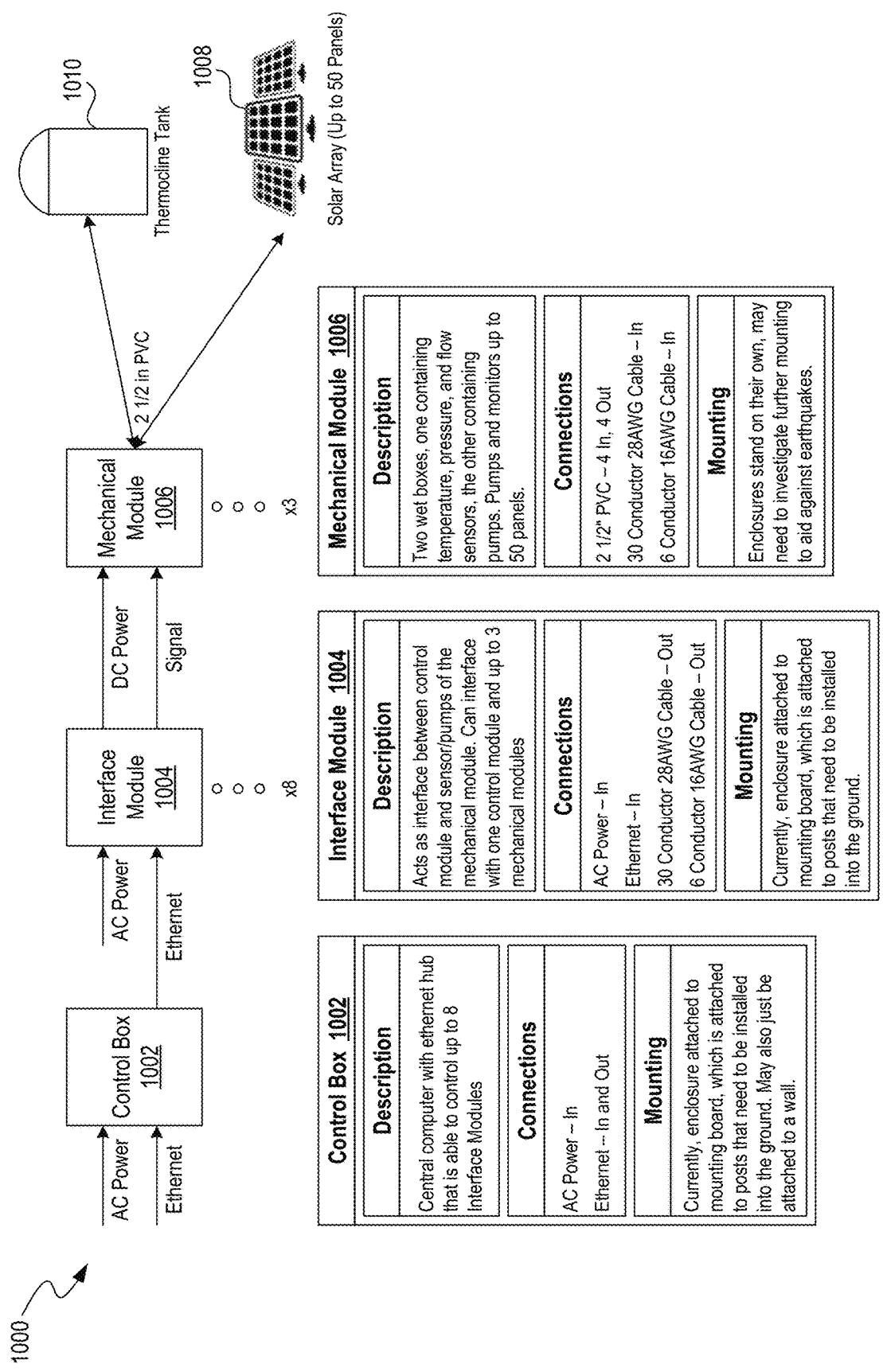
FIG. 10 is a block diagram that illustrates an example of a co-generation or hybrid photovoltaic-thermal system.

FIG. 10 is a diagram that illustrates example components of a co-generation or hybrid photovoltaic-thermal system 1000. As illustrated, the system 1000 includes a control box 1002 or subsystem, interface modules 1004 or subsystems, and mechanical modules 1006 or subsystems. The system 1000 further includes one or more PV panels 1008 for the generation of electrical energy and a thermal battery 1010 for the storage of the co-generated thermal energy. In some embodiments, the thermal battery 1010 is a thermocline tank that stores a fluid with thermal stratification. For example, the thermocline tank stores a single fluid (e.g., water, a nanofluid) with different thermal energies or temperatures at different regions or levels within the tank.

In some embodiments, the control box 1002 or subsystem includes a central computing device that is coupled to one or more interface modules 1004. The control box 1002 can execute operations or processes to control the flow of thermal fluid through heat exchangers attached to the PV panels, to control the supply of heated thermal fluid from the thermal battery 1010 to a thermal energy load, to receive sensor data that measures parameters of the system 1000 (e.g., flow rate of thermal fluid through heat exchangers, flow rate of thermal fluid out of the thermal battery 1010, volume of fluid stored in the thermal battery 1010, temperature(s) (and distributions thereof) of the fluid stored in the thermal battery 1010, and/or the like).

In some embodiments, the interface module 1004 acts as an interface between the control box 1002 and a unit or group of mechanical modules 1006. Each mechanical module 1006 can include various mechanical and hardware components, including sensors and pumps. Each mechanical module 1006 is implemented for a unit or group of PV panels 1008, for example, a group of approximately twenty PV panels, approximately thirty PV panels, approximately fifty PV panels, approximately sixty PV panels, approximately 100 PV panels, or the like.

Figure 11B:
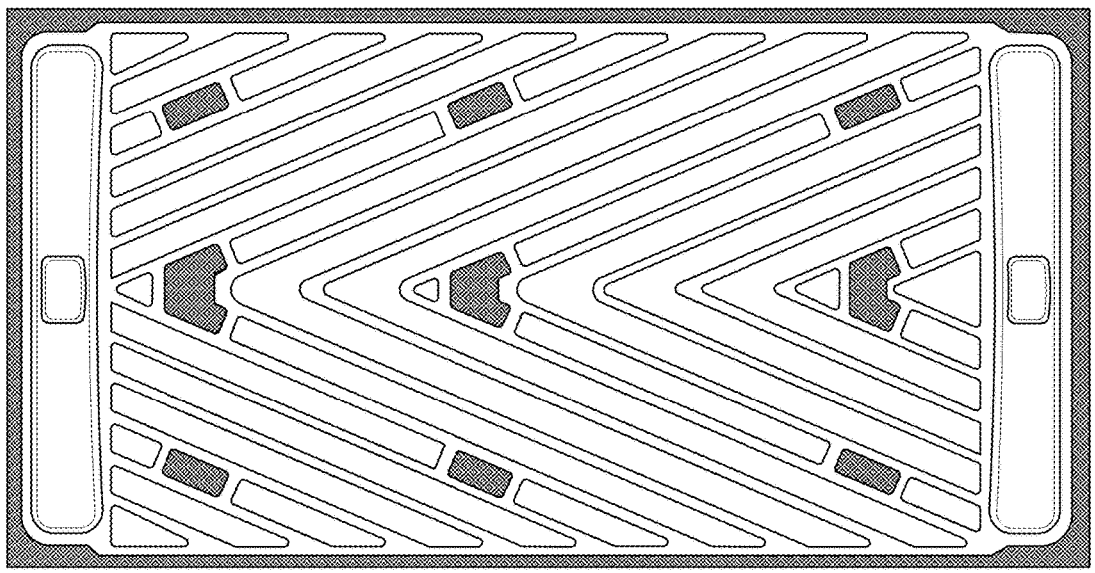
FIGS. 11A and 11B illustrate examples of heat exchangers used in a co-generation or hybrid photovoltaic-thermal system.
Figure 11A:
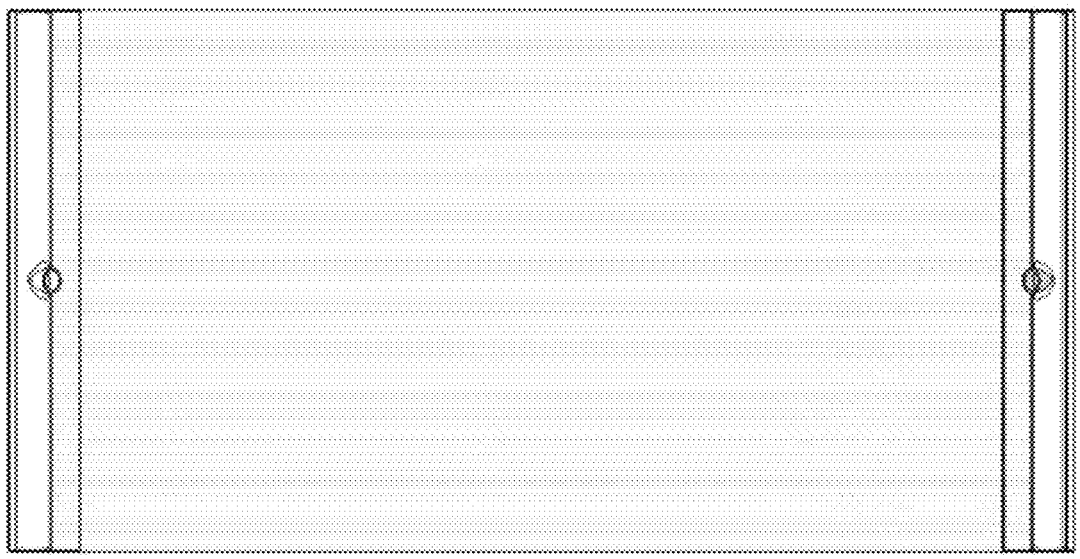

FIGS. 11A and 11B illustrate examples of heat exchangers that are included in a co-generation or hybrid photovoltaic-thermal system to cool down a PV panel. FIG. 11A illustrates a multi-wall or parallel-channel heat exchanger 1102, such as those described with FIGS. 1-4. FIG. 11B illustrates a chevron-channel heat exchanger 1104, such as those described with FIGS. 5-8. Shaded portions of the chevron-channel heat exchanger 1104 illustrated in FIG. 11B shown bonded areas between the two sheets that form the chevron-channel heat exchanger 1104. In a co-generation or hybrid photovoltaic-thermal system, a heat exchanger or extractor attaches to the underside of a PV panel, drawing waste heat away from the surface and enabling the 12-18% power output improvement. In some embodiments, a heat exchanger/extractor can couple to a PV panel via mechanical clasping mechanisms or structures, adhesives, and/or the like.

In some embodiments, the parallel-channel heat exchanger 1102 is constructed of a single piece of material (e.g., polycarbonate, polyvinyl chloride (PVC), polypropylene, and/or the like), and the parallel channels are extruded from the material. In some embodiments, the chevron-channel heat exchanger 1104 is constructed of two sheets that are bonded together at certain areas, with non-bonded spaces between the two sheets defining the chevron channels that conduct the flow of fluid. In some embodiments, a first sheet of the chevron-channel heat exchanger 1104 is a thermal insulator (e.g., acrylonitrile butadiene styrene (ABS), acrylic-polyvinyl chloride, polycarbonate, and/or the like) and a second sheet is a thermal conductor (e.g., aluminum, brass, and/or the like). In some embodiments, one of the two sheets has a higher thermal conductivity than the other of the two sheets, and the sheet with a higher thermal conductivity is closest or interfaces with the PV panel when the heat exchanger is attached to the PV panel. As such, the construction of the heat exchanger facilitates the transfer of heat from the PV panel into the fluid within the heat exchanger and minimizes the loss of heat from the fluid through the opposite sheet (due to its thermally-insulating properties). In some embodiments, the sheets are bonded together with a strong adhesive to form the chevron-channel heat exchanger 1104. In some embodiments, the sheets are coupled to one another to form the heat exchanger via a roll-bonding process as described in this document.

Figure 12:
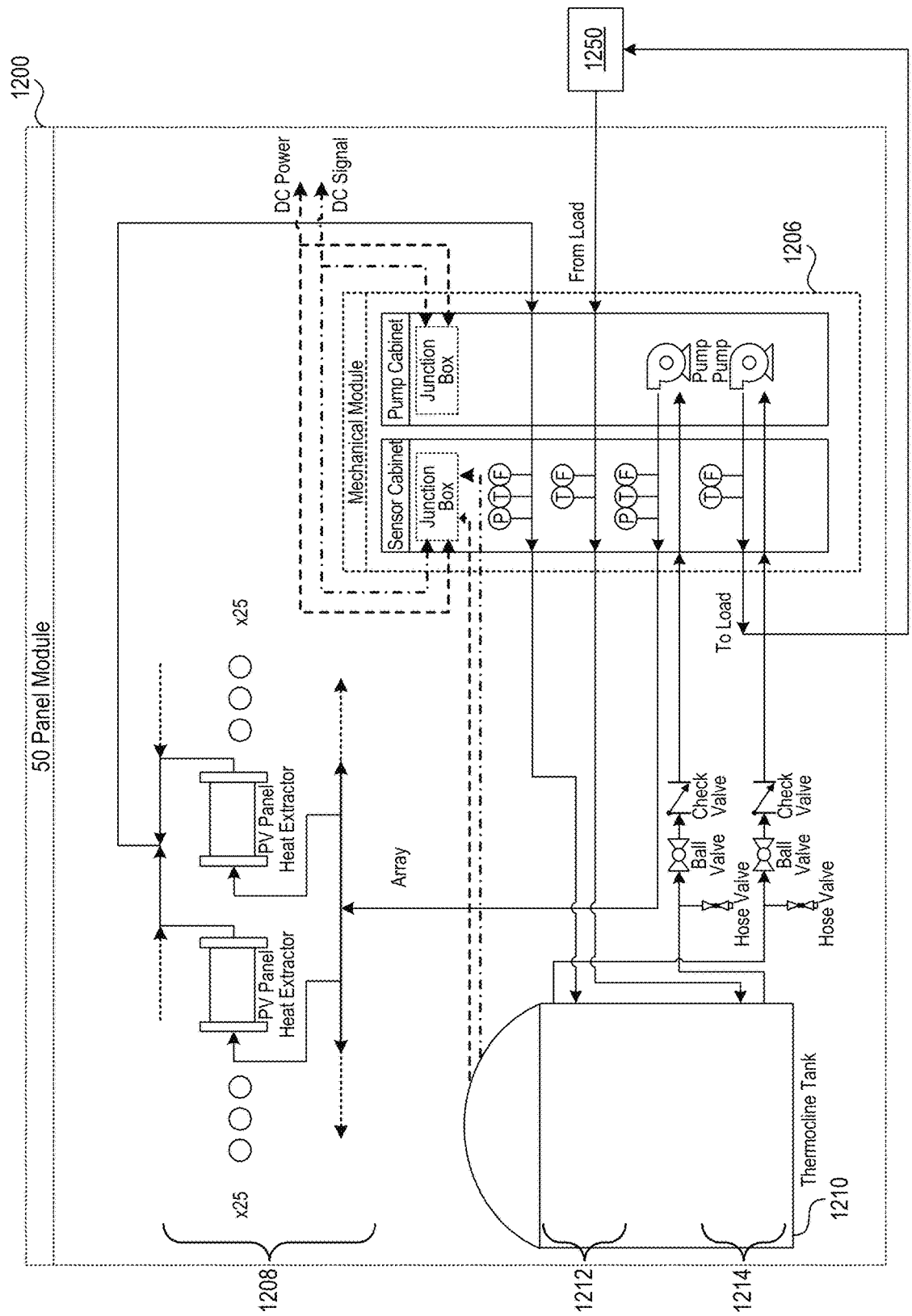
FIG. 12 is a diagram of an example of a co-generation or hybrid photovoltaic-thermal system.

FIG. 12 illustrates a diagram of a modular unit 1200 of an example of a co-generation or hybrid photovoltaic-thermal system. In some embodiments, a modular unit 1200 corresponds to or includes a number (e.g., fifty) of PV panels 1208 that generate electrical energy and include heat exchangers/extractors attached thereto. The modular unit 1200 includes a thermal battery 1210 that serves the number of PV panels 1208, in particular, by storing waste (and heated) fluid from the heat exchangers/extractors attached to the PV panels 1208. Accordingly, the thermal battery 1210 is fluidically coupled with the heat exchangers/extractors in order to receive fluid that has flowed through and exited the heat exchangers/extractors. As illustrated, the modular unit 1200 includes a mechanical module 1206 that includes sensors, pumps, and related hardware components for facilitating the supply of fluid to and/or from the heat exchangers, the thermal battery 1210, and external load(s) 1250 coupled to the modular unit 1200. The mechanical module 1206 can be operated to control said fluid supply, transmit sensor data, and/or the like by a control box or module in concert with other mechanical modules of other modular units of the co-generation or hybrid photovoltaic-thermal system.

The thermal battery 1210 is a tank that stores the fluid output by the heat exchangers/extractors attached to the PV panels 1208. In some embodiments, the thermal battery 1210 is a single tank that stores the fluid in a continuous space; for example, the thermal battery 1210 is a thermocline tank with different coexisting zones therewithin. In particular, the thermal battery 1210 can include a first thermocline zone 1212 (e.g., an upper thermocline region) in which the stored fluid has a higher thermal energy than stored fluid within a second thermocline zone 1214 (e.g., a lower thermocline region). The first thermocline zone 1212 associated with higher thermal energies can be located above the second thermocline zone 1214 within the thermocline tank. According to their respective thermal energies, the first thermocline zone 1212 can supply fluid with relatively higher thermal energy to external load(s) 1250, thus fulfilling the thermocline tank's role as a thermal battery, while the second thermocline zone 1214 can recirculate fluid with relatively lower thermal energy back to the heat exchangers/extractors to cool the PV panels 1208 and to continue the co-generation of thermal energy. Examples of external load(s) 1250 to which the thermal battery 1210 supplies thermal energy can include domestic water tanks, heating, ventilation, and air condition (HVAC) systems, electric generators, and/or the like. In some embodiments, the thermal battery 1210 includes a first set of outlets through which fluid can be received at or outlet from the first thermocline zone 1212, and a second set of outlets through which fluid can be received at or outlet from the second thermocline zone 1214.

Figure 13:
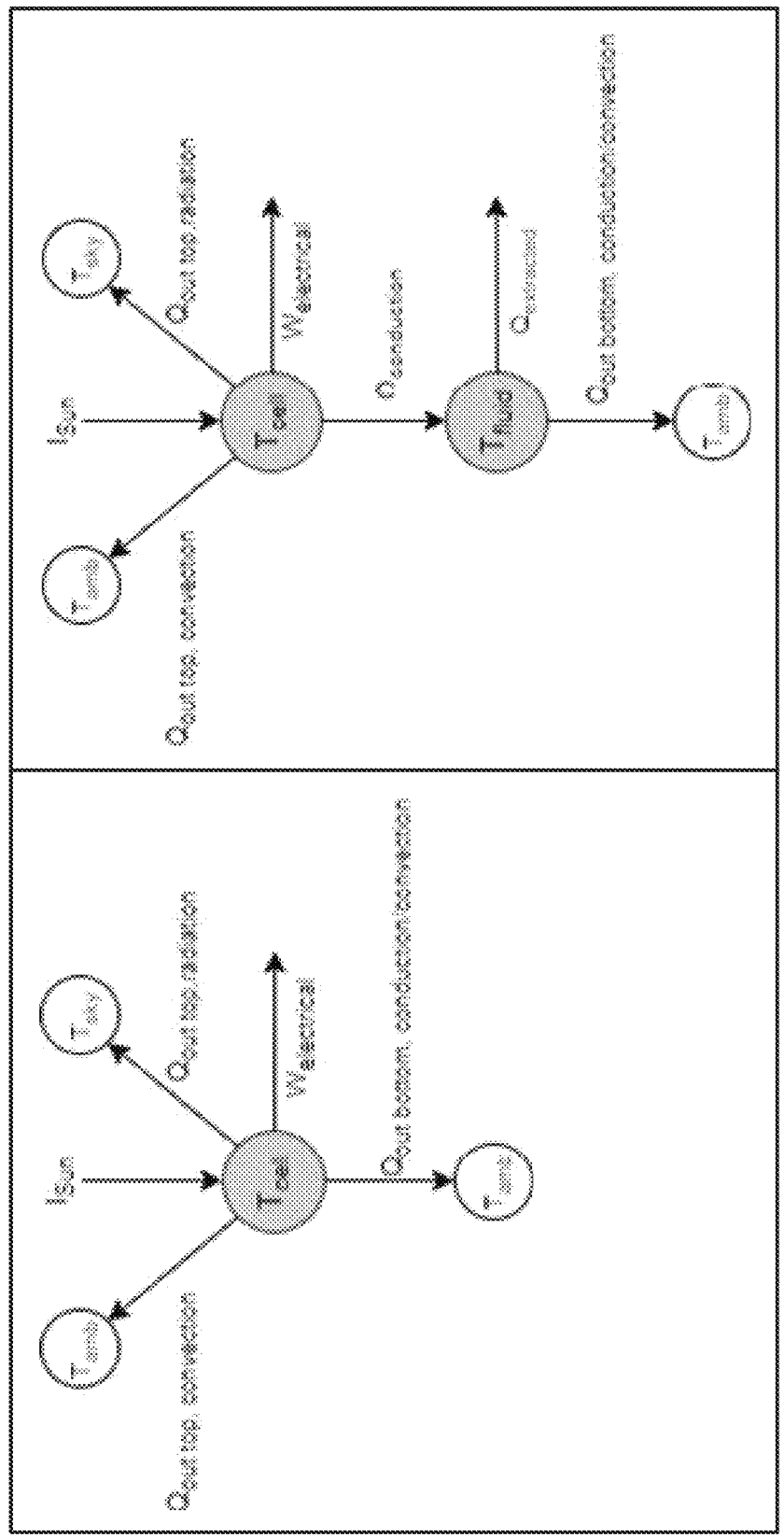
FIG. 13 illustrates an example of a thermal circuit formed by a co-generation or hybrid photovoltaic-thermal system.

FIG. 13 illustrates thermal circuits related to a co-generation or hybrid photovoltaic-thermal system. In particular, the circuit shown on the left of FIG. 13 demonstrates energy flow based on a single-generation system of a PV panel generating electrical energy. The circuit shown on the right of FIG. 13 demonstrates an improved energy flow based on a co-generation system that generates and supplies both electrical energy and thermal energy.

Figure 14A:
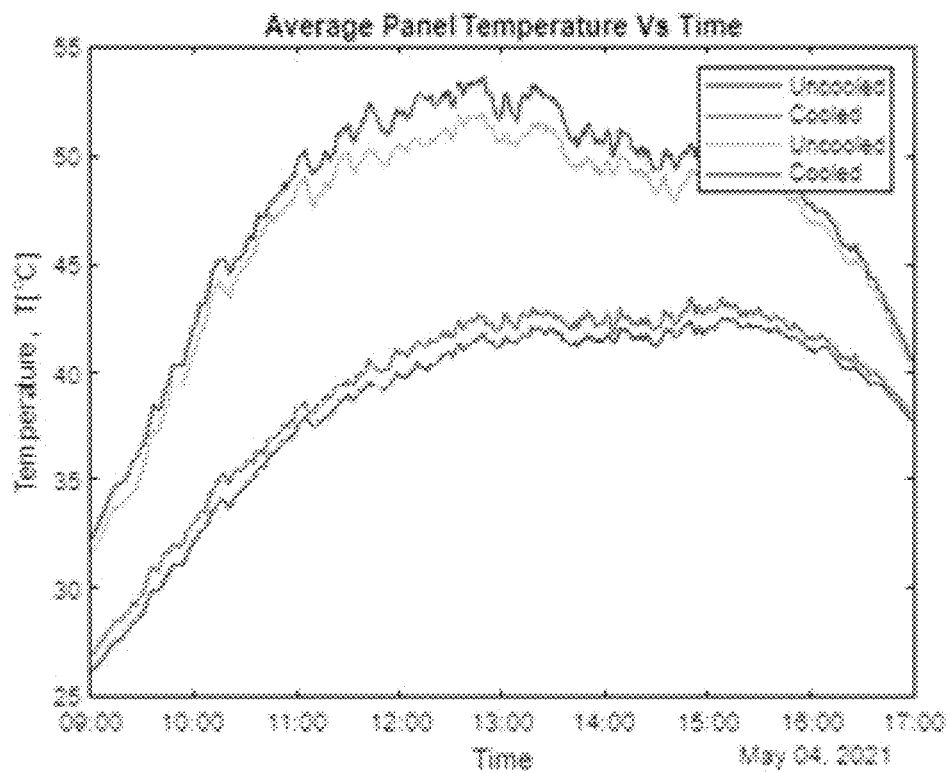
FIGS. 14A and 14B illustrate experimental cooling data from an example co-generation or hybrid photovoltaic-thermal system.
Figure 14B:
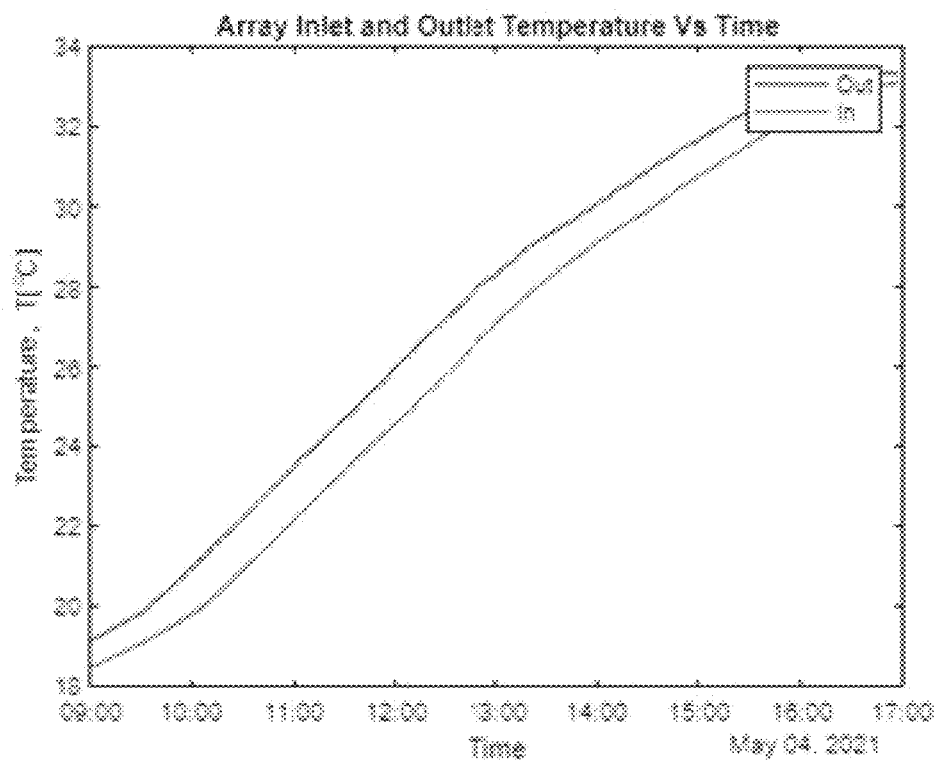
Figure 15:
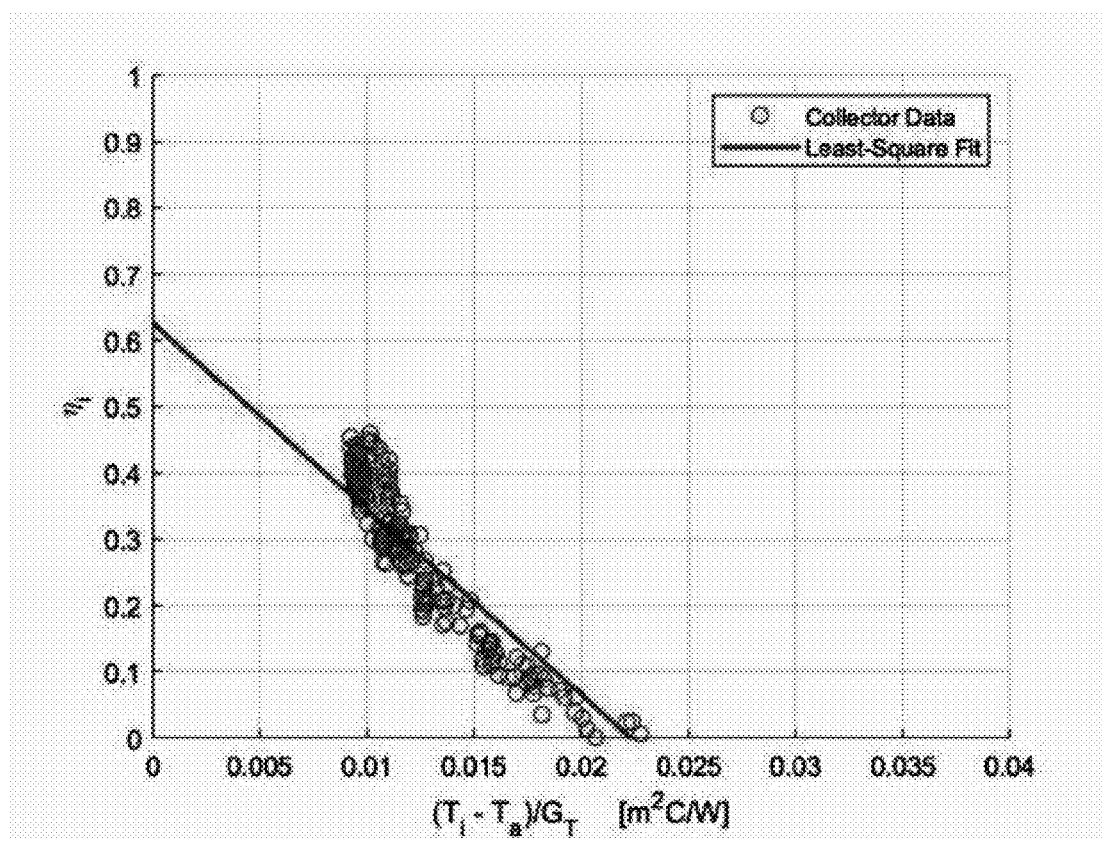
FIG. 15 illustrates an experimental efficiency curve from an example co-generation or hybrid photovoltaic-thermal system.

FIGS. 14A-14B and 15 illustrate experimental results collected from an example implementation of a co-generation or hybrid photovoltaic-thermal system as described herein. These experimental results demonstrate the technical feasibility and benefits of the example embodiments. For example, these experimental results successfully demonstrate PV panel cooling and co-generation of thermal energy.

The experimental results demonstrated the potential for the heat extractors to reduce PV panel surface temperature by 12° C. on average compared to a standalone PV panel. In some instances, the maximum average panel surface temperature difference between the control and the test panel was 18° C. which can increase efficiency by 12% (some individual cells recorded surface temperature differences of up to 26° C. at different time instances which can be a 14.5% increase). A 12° C. temperature reduction produces an average fluid temperature gain of 5.7° C. between the inlet and outlet streams. The maximum sustainable fluid temperature gain recorded at that time was 18° C., which corresponded to slower flow speeds and less panel cooling.

Thus, the disclosed embodiments can overcome the technical shortcomings of existing solar energy systems through PV panel cooling and thermal energy generation and storage. In some examples, the disclosed heat extractors can improve PV panel performance, by at least 10%, by at least 12%, by at least 15%, by at least 18%, by at least 20%, or the like. Additionally, rather than using energy from the PV system to charge an electrical battery, the heat/thermal energy from the extractors is stored for on-demand direct use (use of thermal energy, rather than use of electrical energy generated from the thermal energy), creating a thermal battery. The stored heat energy is used to heat the building's water supply which reduces natural gas demand.

In some embodiments, the co-generation or hybrid photovoltaic-thermal system has a modular design that is based on units of fifty panels, providing a scalable design that can be deployed in a variety of locations. This adaptability is another key component, and the heat exchangers are designed for compatibility with most commercially available PV panels. As such, example embodiments are also ideal for retrofitting onto solar panels already in operation, as the noninvasive design provides ease of transition.

The disclosed extractors are unique; corrugations along the extractor enhance structural integrity and improve heat transfer. The extractor can attach without being invasive to the security of the structure or the PV panel itself. These advances enable a low-cost system that substantially outperforms previous hybrid PV/T attempts.

Technical benefits include the following:
1. A 12-18% improvement in electrical output of the PV array is expected. For a 100 kW array, this translates to approximately 18,000 kWh annually. This improvement comes largely as a result of panel cooling. With an increase in performance of 0.5% per degree Celsius of cooling, 20-30° C. of cooling on the hottest days, when uncooled PV panels can reach up to 80° C., is equivalent to a 10-15% increase in performance.
2. The main source of PV panels' inefficiency is their inability to absorb all of the solar spectrum. Only one wavelength of light is completely absorbed, while others are partially or fully converted into thermal energy, heating up the panel. By extracting this heat, example embodiments almost double the power output per square foot of a PV panel.
3. In a given year, a 1000 square foot standard PV array can produce roughly 28-MWhe, which is equivalent to a reduction in 19.8 metric tons (MT) of $CO_2$ annually. A similarly sized installation of a co-generation or hybrid photovoltaic-thermal system would produce around 32 MWhe through the PV panels, and 38.5 MWhth through the heat extractors, resulting in a 22.7MT and 6.95MT reduction in $CO_2$ produced, in total (29.64MT) around 1.5× the reduction in $CO_2$ of a standard PV array.

4. Daytime solar generation is often mismatched with peak energy demand during evening hours (e.g., as demonstrated in the "duck" curve). Utilities and consumers must often rely on fossil fuel generated power or expensive lithium battery storage to meet their peak energy demand. The thermal energy storage tanks allow the user to shift a part of this load, which would typically be handled by electrical or gas heaters, to the thermal energy stored over the course of the day.

5. Cost—utility savings generated through renewable energy and reduced utility power consumption.

Thus, example embodiments can deliver environmental benefits. The co-generation or hybrid photovoltaic-thermal system will have a positive environmental impact as increased deployment of PV leads to reduced pollution and fossil fuel use. PV performance is improved through panel cooling, increasing longevity. Waste disposal represents a current problem for existing PV technology. Although PV panels reduce emissions and dependence on fossil fuels, mitigating pollutive effects for many applications, panels that have reached the end of their lifespan require landfill space as well as potential special containment for heavy metal pollution. Improved panel lifetimes lead to fewer decommissioned panels in need of recycling or waste disposal, reducing the waste footprint of PV. Replacing lithium battery storage with water thermal energy storage will decrease the mining of lithium, which is difficult to recycle. Increased solar deployment reduces pollution and improves air quality leading to improved health. Finally, grid reliability will improve as effective energy storage will transition renewable energy production smoothly into the night-time and reduce strain on fossil fuel plants.

III. EXEMPLARY PROCESSES FOR MANUFACTURING HEAT EXCHANGERS

Aspects of the present disclosure relate to processes for forming, manufacturing, or constructing heat exchangers/extractors for a co-generation or hybrid photovoltaic-thermal system. In some embodiments, heat exchangers described herein can be formed and manufactured according to various techniques such as extrusion and adhesives. For example, a parallel multi-wall heat exchanger is generated based on extruding the parallel channels from a single piece of material. As another example, a chevron-pattern heat exchanger is formed by using an adhesive to bond a first sheet and second sheet together, with chevron-shaped channels being formed in non-bonded portions between the first sheet and the second sheet.

According to example embodiments, a heat exchanger is formed based on roll-bonding two sheets together, and the roll-bonded heat exchanger can have a channel pattern defined during a roll-bonding process. A heat exchanger formed based on a plurality of sheets being roll-bonded together may be understood as a composite heat exchanger. The channel pattern of a roll-bonded heat exchanger can be a parallel channel pattern, a chevron pattern, and/or other patterns suitable for the flow of fluid. In some embodiments, each of the two sheets in the roll-bonding process are made of a thermally-conductive metal material, such as aluminum.

Figure 16A:
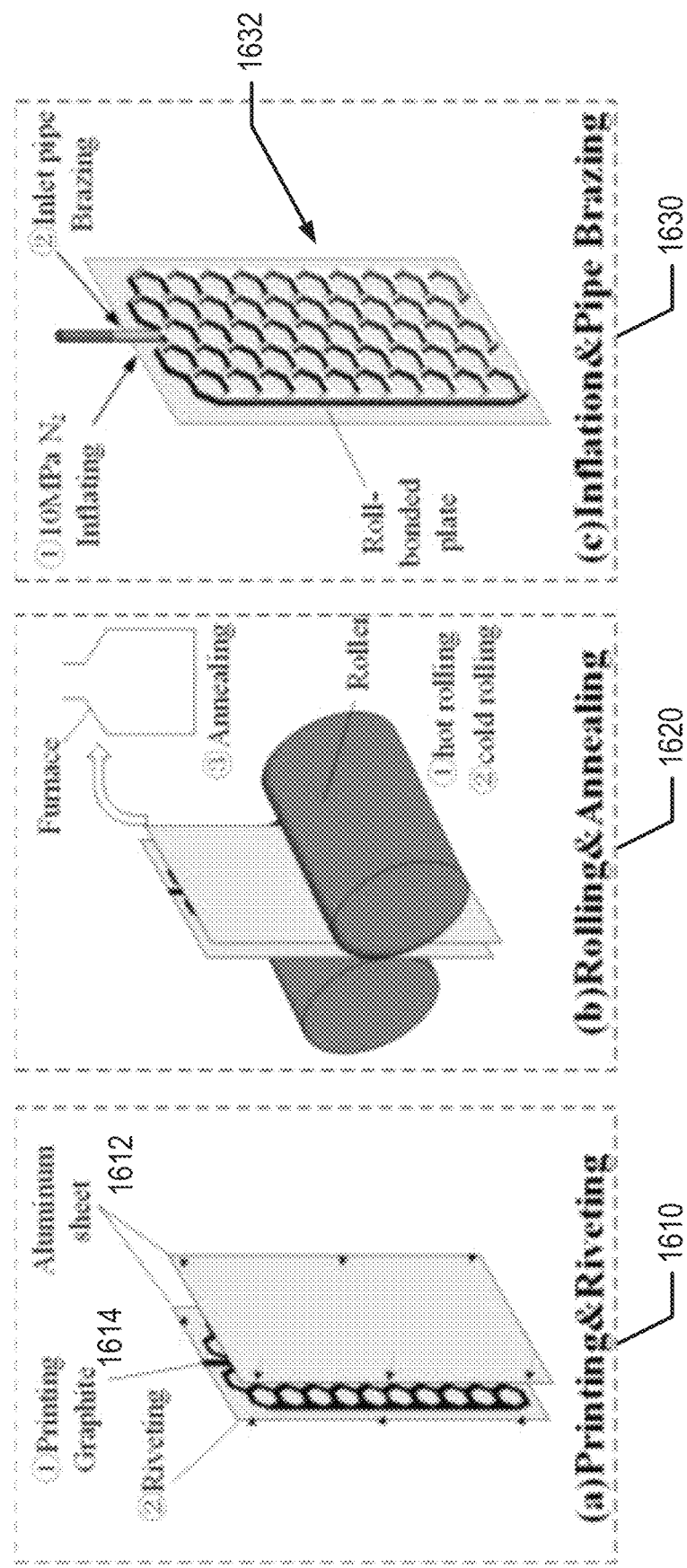
FIGS. 16A and 16B illustrate an example of a roll-bonding process for generating a composite heat exchanger for a co-generation or hybrid photovoltaic-thermal system.
Figure 16B:
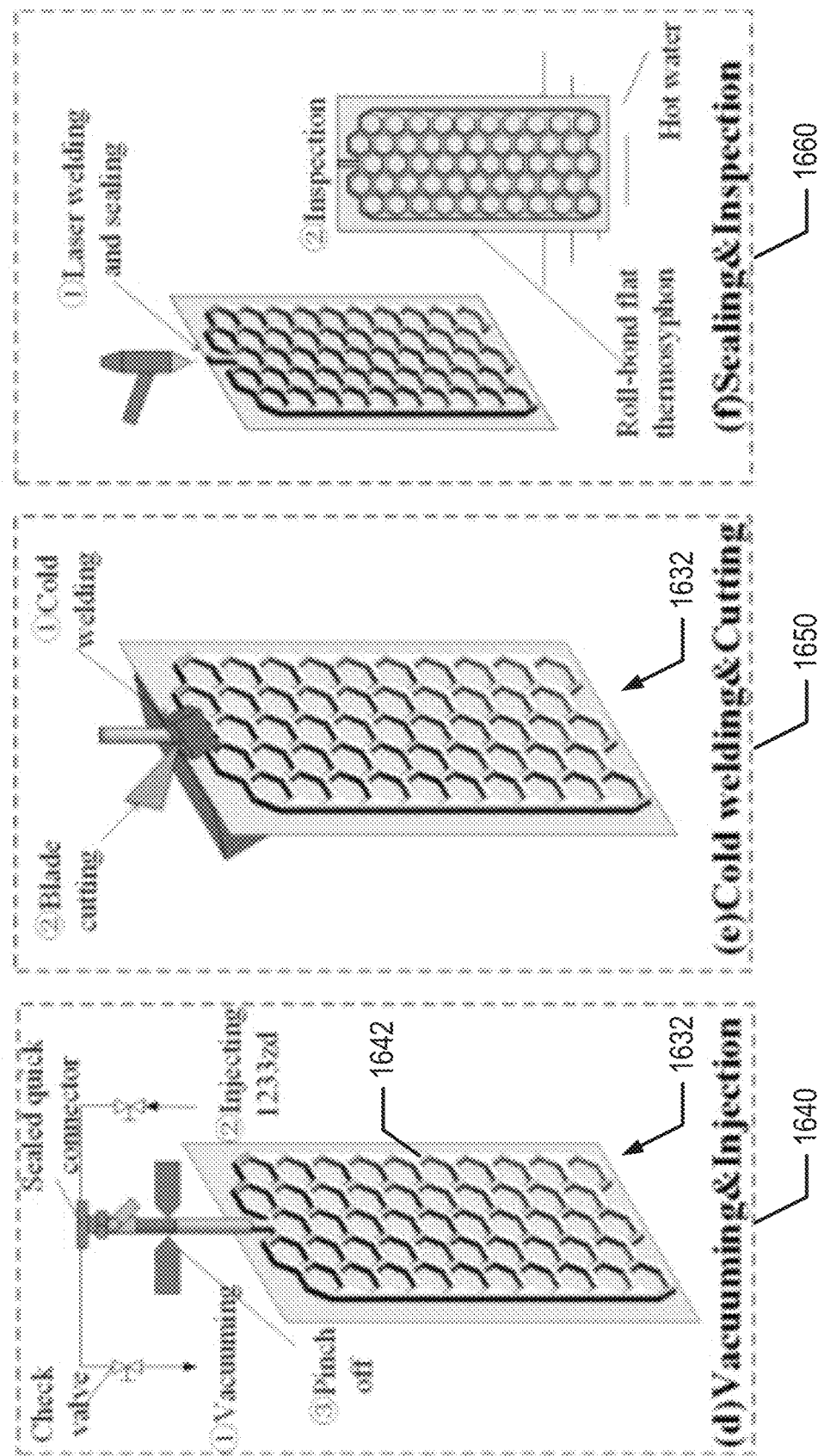

FIGS. 16A and 16B illustrate example operations of a roll-bonding process for generating a composite heat exchanger for a co-generation or hybrid photovoltaic-thermal system. At block 1610, the roll-bonding process includes printing and riveting, in which a graphite pattern 1614 is printed onto at least one of a plurality of sheets 1612, which are then secured to one another. Specifically, the graphite pattern 1614 is screen printed on a side of one of the sheets 1612 that faces another one of the sheets 1612, such that the graphite pattern 1614 is disposed between the sheets 1612. The graphite pattern 1614 prevents bonding between the sheets at select locations. At block 1620, the roll-bonding process includes rolling and annealing the sheets 1612 to bond the sheets together. The sheets 1612 are bonded together at areas not covered by the graphite pattern 1614. The composite heat exchanger 1632 is then formed. At block 1630, the roll-bonding process includes inflation and pipe brazing. A fluid is blown into the bonded piece to inflate along the graphite pattern 1614 where the sheets 1612 did not bond. The roll-bonding process can include double-sided or single-sided inflation. In some embodiments, single-sided inflation is preferred so that one of the sheets 1612 remains substantially flat for close interfacing with a surface of a PV panel.

At block 1640, the roll-bonding process includes vacuuming and injection to complete formation of channels 1642 along the graphite pattern between the sheets. At block 1650, the roll-bonding process includes cold welding and cutting the composite heat exchanger 1632. The composite heat exchanger can be cut and/or shaped to dimensions specified to fit with a PV panel, as described herein. At block 1660, the roll-bonding process includes sealing and inspection of the composite heat exchanger 1632.

Figure 17:
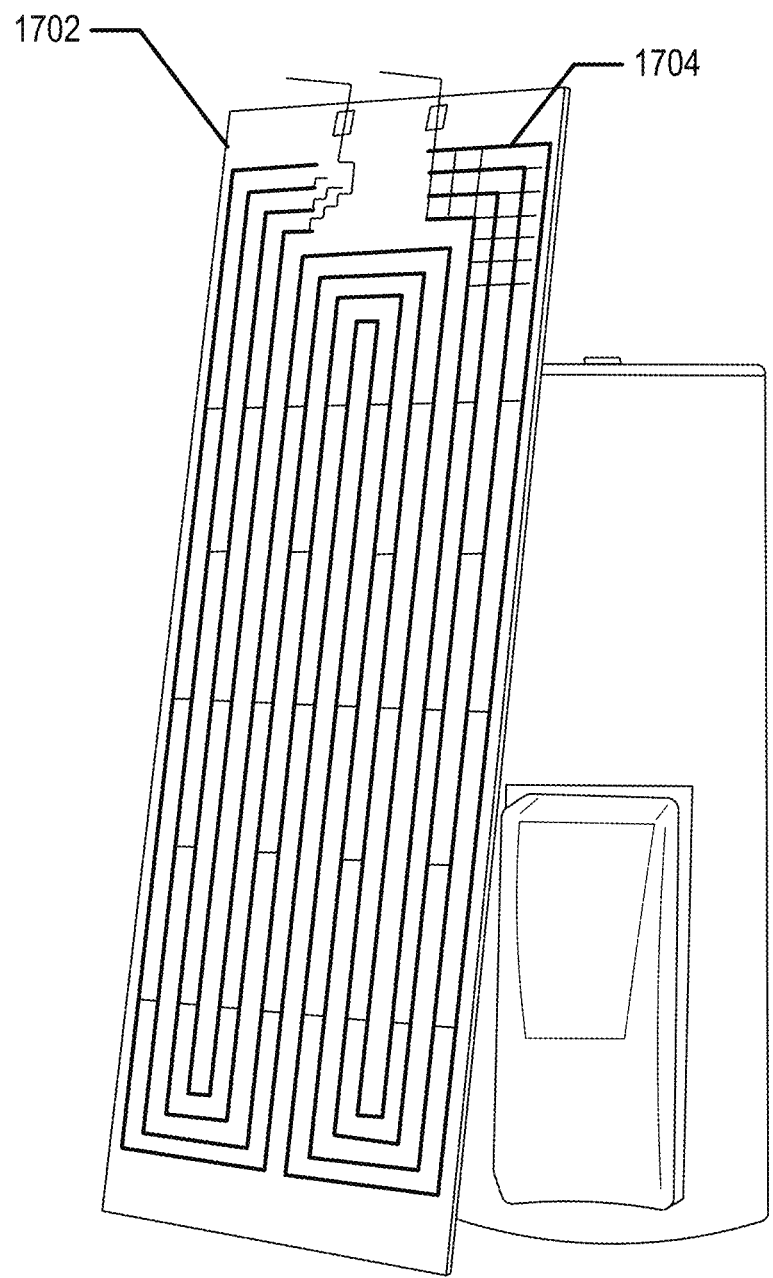
FIG. 17 depicts example components of a co-generation or hybrid photovoltaic-thermal system.

FIG. 17 illustrates an example of a roll-bonded heat exchanger 1702, for example formed by the roll-bonding process described with FIGS. 16A and 16B. As illustrated, the roll-bonded heat exchanger 1702 includes channels 1704 that are defined during the roll-bonding process. Fluid can flow and circulate through the channels 1704 to cool a nearby or adjacent PV panel and to extract/collect heat from the nearby or adjacent PV panel.

IV. EXEMPLARY THERMAL MATERIALS FOR HEAT EXCHANGERS

According to aspects of the present disclosure, thermal materials can improve the operation of a co-generation or hybrid photovoltaic-thermal system. In particular, thermal material can be disposed at certain interfaces, such as between surfaces of a PV panel and a heat exchanger. Additionally, or alternatively, thermal material included in the fluid flowed or circulated through a heat exchanger can coat the internal faces or portions of the channels of the heat exchanger and improve the heat transfer of the fluid, thereby improving a heat exchange efficiency of the heat exchanger. Thus, example embodiments described in this section provide technical improvements to the operation and efficiency of co-generation or hybrid photovoltaic-thermal systems.

The capacity for heat transfer improvement through the inclusion of graphene and graphene oxide is explored in a hybrid system consisting of a photovoltaic (PV) panel and a heat extractor. Graphene has an innately high thermal conductivity, thus making it promising as a thermal interface material. For the temperature cycles of a typical PV panel, thermal stability of graphene can be sufficient, and graphene's negative thermal expansion coefficient represents a safe option. Graphene nanoparticles can also be added to the working fluid of the system, improving thermal conductivity directly.

Figure 18:
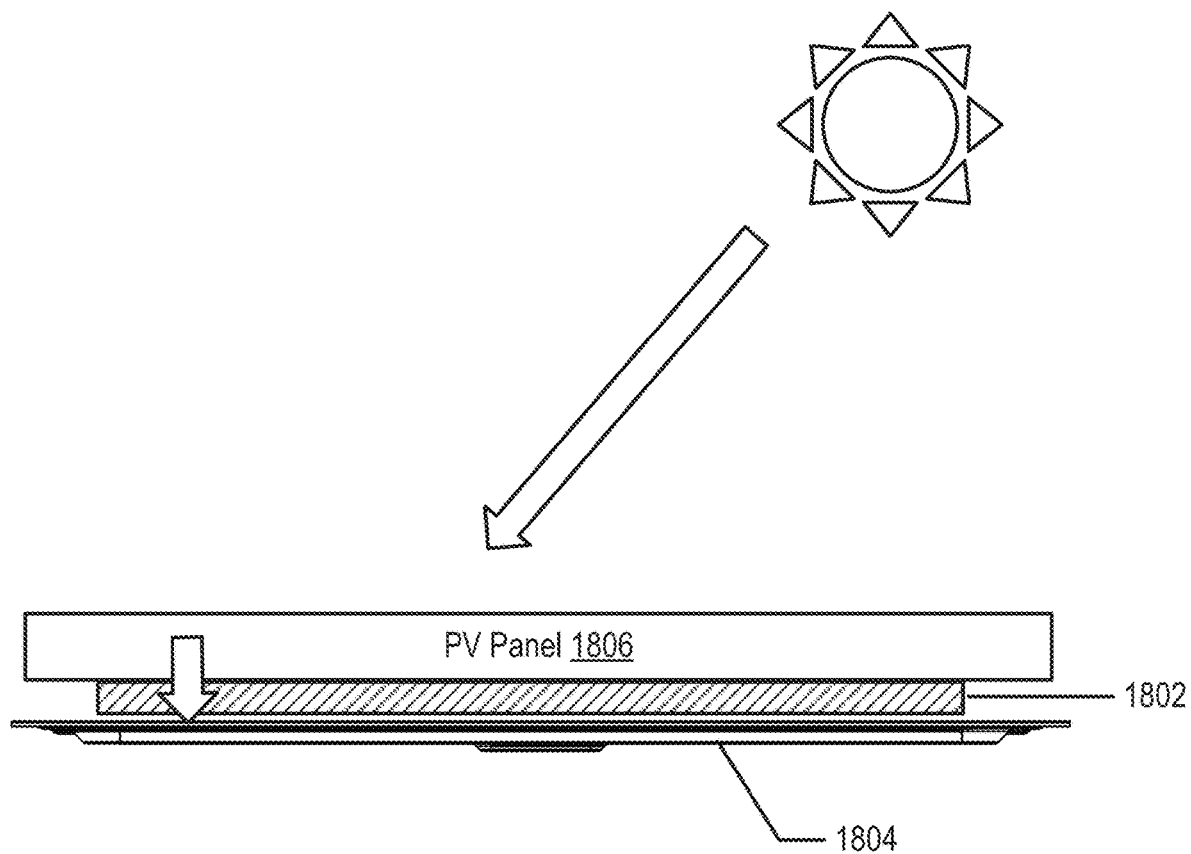
FIG. 18 is a diagram that illustrates an example implementation of thermal interface material (TIM) in a co-generation or hybrid photovoltaic-thermal system.

A hybrid solar photovoltaic/thermal system allows for the capture of incident energy on a photovoltaic panel that would otherwise be lost as heat. The thermal component includes a heat extractor mounted on the back of the PV panel. One face is aluminum or an alternative thermally-conductive material/metal, increasing the heat transfer from the PV panel backsheet, and the other is insulated to retain captured heat. The aluminum face is positioned in as close contact as practical with the back of the PV panel to maximize heat transfer to the cold fluid in the extractor. This serves the dual purpose of cooling the PV panel to increase performance and collecting heat. In some examples, the firm contact between the materials (e.g., metal and plastic), however, may consist of less than 2% of the total surface area. A layer of graphene between the aluminum and the backsheet can serve as a thermal interface material (TIM), improving contact between the two by minimizing the presence of air and facilitating heat transfer, as shown in FIG. 18 (showing a TIM layer 1802 disposed between a heat exchanger 1804 and a PV panel 1806, with arrows indicating the transfer of thermal energy). In some embodiments, one or both of graphene and graphene oxide are included as nanoadditives to the working fluid in the heat extractor, improving heat transfer within the fluid.

Material Properties: Graphene is a material quintessentially comprising of a single layer of carbon atoms arranged in a hexagonal lattice. Modern graphene has a variety of different forms, often relating to the number of carbon layers in the sample. These include monolayer graphene, with one layer, approximating a 2D material; bilayer graphene, with two; few-layer graphene (FLG), which typically has three to five; many-layer graphene, up to around ten; graphene nanoplatelets or graphene powder, which are thicker than layered sheets, but smaller in diameter; and graphene oxide, an altered lattice containing both carbon and oxygen. These 2D graphene forms can also be layered and compressed to reduce porosity and increase conductivity.

The form of graphene most suitable for TIM application is graphene powder. As the bare powder does not bond well to the surface, it can be placed into a polymer matrix such as silicone oil (noncured) or an epoxy resin (cured) with various weight percentages. Graphene powder is typically on the scale of microns per particle diameter, and nanometers in thickness.

The presence of water in a PV panel decreases the performance of the system, and materials with low water vapor transmission rate (WVTR) are therefore desirable. Monolayer graphene has a low WVTR when layered on polymer such as polyethylene terephthalate, a common material for PV panel backsheets, on the order of metals such as aluminum. It is expected that graphene powder within a polymer base would also decrease WVTR for the system, which increases long-term durability. Accordingly, graphene as implemented in a co-generation or hybrid photovoltaic-thermal system include monolayer graphene, in some embodiments.

Other nano-materials are also of interest including coatings to improve heat transfer to the fluid and particulates to improve heat capacity of the fluid Thermal Interface Materials: The unique structure of graphene allows for an extremely high thermal conductivity in-plane in samples of pristine 2D graphene (5000 W/m*K) due to phonon conducting behavior. For practical purposes, other forms of graphene are generally needed, which have reduced thermal conductivity. However, in these forms, graphene maintains a bulk thermal conductivity (~10 W/m*K) [2, 3] that is still several orders of magnitude higher than that of air (0.024 W/m*K). Accordingly, graphene is used as TIM within a co-generation or hybrid photovoltaic-thermal system.

In some embodiments, a co-generation or hybrid photovoltaic-thermal system includes compressed graphene structures (e.g., such as a "graphene paper") at interface locations, such as the location shown in FIG. 18. Example dimensions of such a compressed graphene structure is approximately 10 mm×2 mm×50 μm, and this example compressed graphene structure can have a thermal conductivity up to 50 W/m*K.

In some embodiments, a co-generation or hybrid photovoltaic-thermal system includes graphene in powder form, which can have a thermal conductivity of 13.5-23.8 W/m*K. Although this thermal conductivity is below that of both pristine 2D graphene and the graphene paper (attributed to thermal contact resistance as well as increased phonon scattering due to the uneven structure), graphene powder can be used as a particulate within the fluid flowed through heat exchangers.

In some embodiments, a mechanism is used for applying a non-curing graphene filler TIM to a metallic surface, using silicone oil as a base polymer matrix for the graphene. This system forms a particle-laden polymeric (PLP) TIM that behaves as a Herschel-Bulkley fluid. PLPTIMs can be produced more easily at the required scales, making them an attractive candidate. The thermal resistance of this system is given by Equation 1:

$$R = \frac{BLT}{k_{TIM}} + R_{c_1} + R_{c_2} \quad (1)$$

where BLT is the bond line thickness of the TIM, $k_{TIM}$ is the bulk thermal conductivity of the TIM, and $R_{c_1}$, $R_{c_2}$ are the contact resistances of each side of the TIM. BLT for a typical system should be around 25-100 μm.

Figure 19:
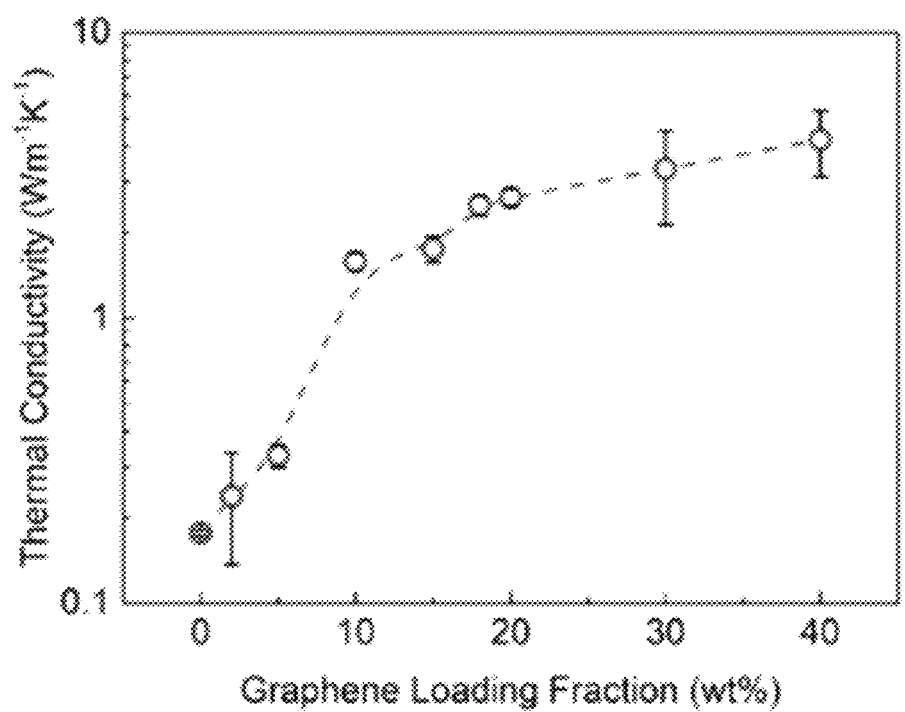
FIG. 19 shows an example of thermal conductivity of graphene fillers in silicone oil base by percentage.

The silicone oil used in applying non-curing graphene filler TIM to a metallic surface has a thermal conductivity of 0.18 W/m*K, but this rapidly increases with the loading fraction of graphene filler, as shown in FIG. 19. In some embodiments, a similar thermal conductivity can be obtained using FLG graphene sheets in an electrically conductive silver epoxy. Specifically at a graphene volume fraction of 50%, a thermal conductivity around 10 W/m*K can be found.

Figure 20:
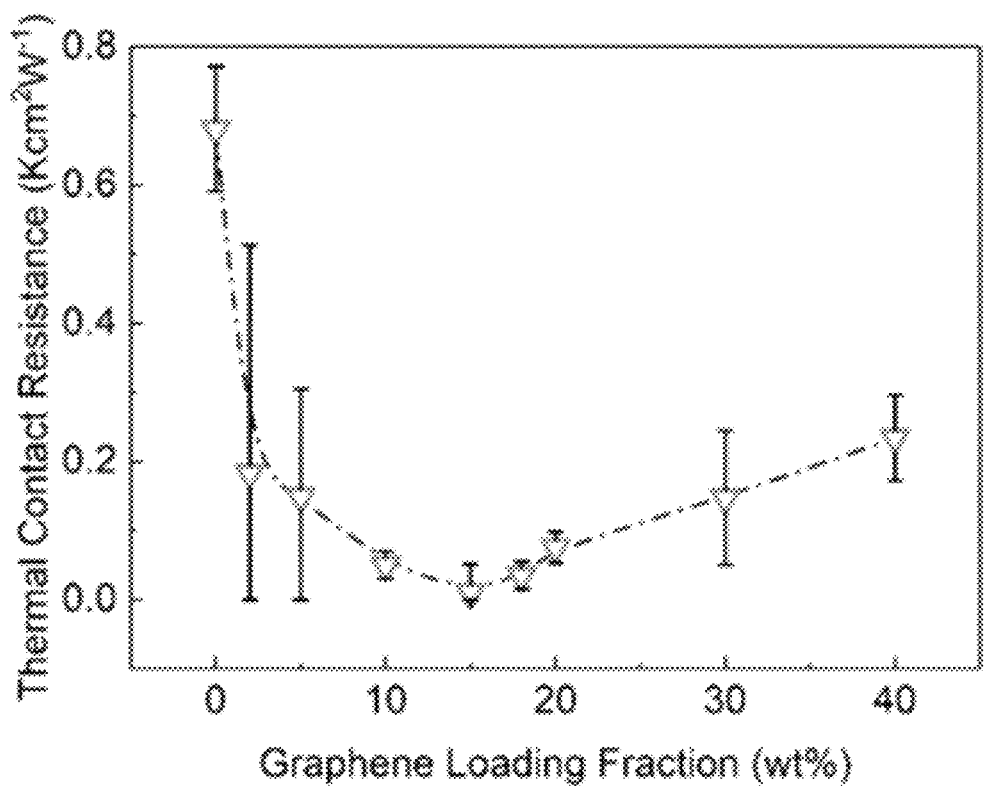
FIG. 20 shows an example of thermal contact resistance of graphene fillers in silicone oil base by percentage.

Also of interest are the thermal contact resistances between the TIM and the outer surfaces, as the total thermal resistance and therefore total conductivity depend on them. Although the internal thermal conductivity appears to increase with the loading fraction of graphene filler, the contact resistance on a metallic surface reaches a minimum at approximately 15% loading fraction as shown in FIG. 20, so that there is a non-monotonic relationship between the graphene loading and the contact resistance. After the minimum is reached, it is followed by a slight increase in the contact resistance.

This minimum is hypothesized to result from the dependence of thermal contact resistance on both bulk thermal conductivity and shear modulus, according to Equation 2:

$$R_{c_1+c_2} = c\left(\frac{s_q}{K_{TIM}}\right)\left(\frac{G}{P}\right)^n \quad (2)$$

where G contains both the storage modulus and the shear modulus, $S_q$ is the surface roughness, P represents the pressure on the TIM, n and c are empirical constants, and $K_{TIM}$ is the bulk thermal conductivity. After the minimum, the loading fraction is sufficient to alter the shear modulus of the TIM and begins to prevent effective contact with the surface, despite the overall increase in thermal conductivity from the increased graphene. In some examples, the overall thermal conductivity of an MLG-modified TIM matrix can be described through Equation 3:

$$K = K_p \left( \frac{2f(K_p - K_m) + 3K_m}{(3-f)K_p + K_m f + \frac{R_B K_p K_m f}{H}} \right) \quad (3)$$

where $K_p$ and $K_m$ describe the thermal conductivities of the filler and matrix materials, f is the volumetric loading fraction, H represents the thickness, and $R_B$ is the thermal boundary resistance at the graphene-matrix interface.

Figure 21:
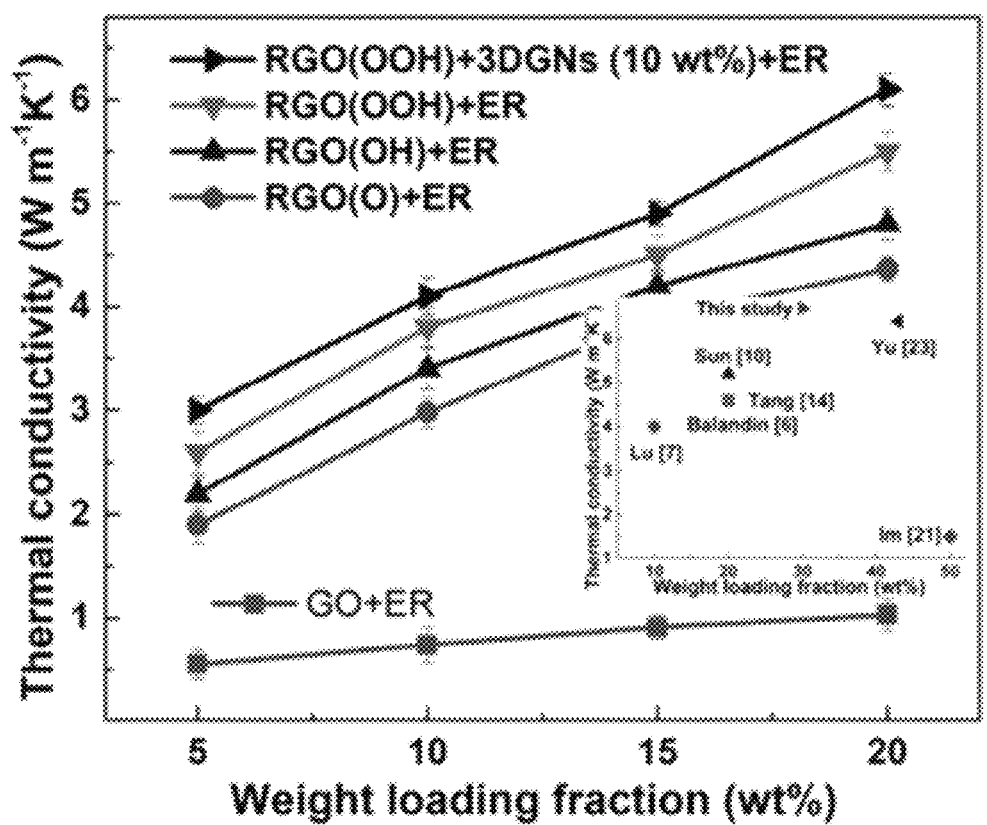
FIG. 21 shows an example of thermal conductivity of reduced graphene oxide fillers in epoxy resin base by percentage.

Graphene Oxide: Graphene oxide (GO) is the result of oxidizing regular graphene, a matrix of carbon, hydrogen, and oxygen. GO can be treated further to form reduced graphene oxide (RGO). Two-dimensional GO loses some conductivity compared to pristine 2D graphene due to phonon scattering; the loss varies with oxidation degree. At 0.35 oxidation level (i.e., a GO matrix comprised of 35% oxygen) the thermal conductivity is around 72 W/m*K. In some examples, cured epoxy resin TIM using RGO fillers improves the thermal conductivity substantially when compared to the pure epoxy. This system continued to improve with the introduction of 3D graphene networks (3DGN) produced through chemical vapor deposition, with the RGO serving as a "bridge" to connect the graphene and the epoxy resin. Example results of RGO with different functionalized groups and 3DGN as a function of loading fraction are displayed in FIG. 21.

Graphene Nanofluid: Nanoparticles of graphene can also be added directly to the water of the hybrid PV/thermal system, creating a graphene nanofluid. The suspended nanoparticles augment the thermal properties of the original fluid, improving the heat transfer capabilities. At the same Reynolds numbers, nanofluids demonstrate an increase in heat transfer performance compared to the original working fluid. In some examples, a 0.1 weight percent of graphene in water is sufficient to increase thermal conductivity in the fluid by 29% at 45° C. Importantly, the viscosity of the fluid is also altered by the presence of the nanoparticles, but this is highly temperature dependent. At 20° C., the nanofluid viscosity is increased by 175% compared to water, but at 50° C. the viscosity is 25% lower than that of water. The resulting nanofluid is Newtonian. In some embodiments, a graphene oxide nanofluid increases the heat transfer coefficient by up to 62% for a 0.2% volume concentration of GO. The results indicate that both graphene and graphene oxide nanofluids are candidates for efficient working fluids.

Therefore, example embodiments can incorporate graphene as a TIM via various example means described herein to improve the operation of a hybrid solar PV/thermal system. In some embodiments, a particular option for graphene incorporation is selected to specifically optimize a particular system and to balance against the effects of possible degradation or contamination on thermal properties. A TIM consisting of graphene filler in a polymer base represents one of the most promising candidates. The possibility of water's enhancement with a graphene-based nanofluid is likewise attractive. A combination of several potential improvements is of interest since there is no mutual exclusivity. Stability of the proposed improvements is crucial to longevity, and of course cost will be a major factor. An economic analysis of the most viable options is therefore a key next step. Refining this hybrid system will provide a straightforward means to increase the efficiency of ever more ubiquitous PV panels, lessening the impact of human energy consumption on the environment.

V. CONCLUSION

The Figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. An energy co-generation system for hybrid photovoltaic-thermal energy output to reduce natural gas usage, comprising:

a photovoltaic panel configured to convert at least a portion of light incident upon a first surface of the photovoltaic panel into electrical energy for consumption by an electrical load;

a heat exchanger that is coupled to a second surface of the photovoltaic panel that opposes the first surface of the photovoltaic panel,
   wherein the heat exchanger comprises a plurality of individual fluid channels through which a fluid flows and collects heat emitted from the photovoltaic panel,
   wherein the plurality of individual fluid channels are defined by non-bonded areas between a first sheet and a second sheet of the heat exchanger each spanning a respective length between an inlet of the heat exchanger and an outlet of the heat exchanger, and
   wherein each of the plurality of individual fluid channels directs the fluid in communication with the non-bonded areas that are coated with nanoparticles of a thermally-conductive material that includes at least one of graphite, graphene, or graphene oxide; and a thermal tank fluidically coupled to the outlet of the heat exchanger to receive and store the fluid after the fluid collects the heat emitted from the photovoltaic panel, the thermal tank being configured to supply the fluid to an external thermal energy load while the fluid retains at least a portion of the heat.

2. The energy co-generation system of claim 1, wherein the thermal tank is a thermocline tank that includes a first tank outlet for supplying the fluid stored within the thermal tank to the external thermal energy load and a second tank outlet for re-circulating the fluid stored within the thermal tank to the inlet of the heat exchanger, wherein the first tank outlet is located at an upper thermocline region of the thermal tank and the second tank outlet is located at a lower thermocline region of the thermal tank.

3. The energy co-generation system of claim 1, further comprising:
   the external thermal energy load to which the thermal tank supplies the fluid, wherein the external thermal energy load is a system that directly consumes the fluid.

4. The energy co-generation system of claim 1, wherein the external thermal energy load is a generator system configured to convert the at least a portion of the heat retained by the fluid to electrical energy.

5. The energy co-generation system of claim 1, wherein the channels are parallel with each other.

6. The energy co-generation system of claim 1, wherein the channels form a chevron pattern that conducts a directional flow of the fluid.

7. The energy co-generation system of claim 6, wherein the first sheet has a first thermal conductivity and the second sheet has a second thermal conductivity, the second thermal conductivity being greater than the first thermal conductivity, wherein the second sheet interfaces with the second surface of the photovoltaic panel.

8. The energy co-generation system of claim 1, wherein the heat exchanger is constructed via roll-bonding the first sheet and the second sheet.

9. The energy co-generation system of claim 1, further comprising:
   a layer of thermal interface material (TIM) occupying a space between the second surface of the photovoltaic panel and the heat exchanger coupled to the second surface of the photovoltaic panel.

10. The energy co-generation system of claim 1, wherein the fluid is a nanofluid with nanoadditives of a graphene or graphene oxide material.

11. A heat exchanger to extract consumable thermal energy from photovoltaic panels for reduction of natural gas usage, the heat exchanger comprising:
   a first sheet constructed from a thermally-insulating plastic;
   a second sheet constructed from a thermally-conductive metal and bonded to the first sheet, the second sheet configured to interface with at least one of the photovoltaic panels; and
   a plurality of individual fluid channels defined by non-bonded areas between the first sheet and the second sheet each spanning a respective length between an inlet of the heat exchanger and an outlet of the heat exchanger, the plurality of individual fluid channels directing fluid received at the inlet of the heat exchanger to the outlet of the heat exchanger such that the fluid collects heat emitted from the at least one of the photovoltaic panels through the second sheet,
   wherein each of the plurality of individual fluid channels directs the fluid in communication with the non-bonded areas of the first sheet and the second sheet that are coated with nanoparticles of a thermally-conductive material that includes at least one of graphite, graphene, or graphene oxide.

12. The heat exchanger of claim 11, wherein the first sheet is roll-bonded with the second sheet, and wherein the plurality of fluid channels are defined based on a channel pattern disposed on the first sheet preventing bonds forming at patterned locations between the first sheet and the second sheet.

13. The heat exchanger of claim 12, wherein the channel pattern disposed on the first sheet includes the nanoparticles including the at least one of graphite, graphene, or graphene oxide being coated on the non-bonded areas of the first sheet.

14. The heat exchanger of claim 12, wherein the plurality of individual fluid channels are further defined based on a single-sided inflation of fluid between the first sheet and the second sheet subsequent to the first sheet being roll-bonded with the second sheet.

15. The heat exchanger of claim 11, further comprising:
   a layer of thermal interface material disposed on a surface of the second sheet that interfaces with the surface of the photovoltaic panel.

16. A method for co-generation of thermal energy with a photovoltaic system to reduce natural gas usage, the method comprising:
   coupling a heat exchanger comprising a first sheet and a second sheet to a photovoltaic panel such that the second sheet of the heat exchanger interfaces with at least a portion of the photovoltaic panel,
       wherein the heat exchanger comprises a plurality of individual fluid channels defined by non-bonded areas between the first sheet and the second sheet each spanning a respective length between an inlet of the heat exchanger and an outlet of the heat exchanger;
   flowing a fluid through the plurality of individual fluid channels of the heat exchanger for the fluid to collect heat from the photovoltaic panel through the second sheet,
       wherein each of the plurality of individual fluid channels directs the fluid in communication with the non-bonded areas of the first sheet and the second sheet that are coated with nanoparticles of a thermally-conductive material that includes at least one of graphite, graphene, or graphene oxide;

receiving the fluid from the heat exchanger at a thermal battery, the thermal battery configured to store the fluid and to cause the fluid to retain at least a portion of the heat collected from the photovoltaic panel;

storing electrical energy generated by the photovoltaic panel in an electrical battery; and supplying, to a thermal load, the fluid stored in the thermal battery to thermally energize the thermal load.

17. The method of claim 16, wherein the fluid includes nanoadditives that increase a thermal conductivity of the fluid.

18. The method of claim 16, wherein coupling the heat exchanger to the photovoltaic panel comprises:

interfacing the second sheet of the heat exchanger to a surface of the photovoltaic panel that is opposite of another surface of the photovoltaic panel having light incident thereon from which the photovoltaic panel generates the electrical energy, the second sheet being thermally-conductive.

19. The method of claim 16, wherein the thermal battery comprises a thermocline tank in which the fluid is stored.

20. The heat exchanger of claim 11, wherein the plurality of individual fluid channels defined by the non-bonded areas are arranged in a pattern that increases turbulence of the fluid.

\* \* \* \* \*